US012562788B2

(12) United States Patent
Svantesson et al.

(10) Patent No.: US 12,562,788 B2
(45) Date of Patent: Feb. 24, 2026

(54) SYSTEMS AND METHODS FOR SPATIAL COMPATIBILITY DETERMINATION AND WEIGHT GENERATION USING BEAMFORMED SOUNDING SIGNALS

(71) Applicant: Tarana Wireless, Inc., Milpitas, CA (US)

(72) Inventors: Thomas Svantesson, Santa Clara, CA (US); Eric Pierre Rebeiz, Mountain View, CA (US)

(73) Assignee: Tarana Wireless, Inc., Milpitas, CA (US)

( * ) Notice: Subject to any disclaimer, the term of this patent is extended or adjusted under 35 U.S.C. 154(b) by 0 days.

(21) Appl. No.: 18/759,497

(22) Filed: Jun. 28, 2024

(65) Prior Publication Data

US 2026/0005735 A1 Jan. 1, 2026

(51) Int. Cl.
*H04B 17/309* (2015.01)
*H04B 7/0456* (2017.01)
(Continued)

(52) U.S. Cl.
CPC ......... *H04B 7/0456* (2013.01); *H04B 7/0632* (2013.01); *H04B 7/0634* (2013.01); *H04L 5/0023* (2013.01)

(58) Field of Classification Search
CPC . H04W 72/542; H04W 52/241; H04W 72/23; H04W 88/08; H04W 72/541;
(Continued)

(56) References Cited

U.S. PATENT DOCUMENTS 8,184,752 B2 5/2012 Ko et al.
9,577,700 B2 2/2017 Lea et al.
(Continued)

FOREIGN PATENT DOCUMENTS

WO 2024211172 A1 10/2024

OTHER PUBLICATIONS

PCT Application No. PCT/US2025/032317 titled "Systems and Methods for Spatial Compatibility Determination and Weightgeneration Using Beamformed Sounding Signals" filed Jun. 4, 2025.
(Continued)

*Primary Examiner* — Eva Y Puente
(74) *Attorney, Agent, or Firm* — Stoel Rives LLP

(57) ABSTRACT

Systems and methods for spatial compatibility determination and weight determination include a base node transmitting a sequence of beamformed sounding signals to a plurality of nodes including at least two nodes; receiving, responsive to the sequence and at the base node, receive signal strength data and signal to interference data for each node of the plurality of nodes; and, calculating, at the base node, a compatibility metric for the at least two nodes. Scheduling the at least two nodes to use a same time-frequency resource based on the compatibility metric and, and transmitting signals using the same time-frequency resource to the at least two nodes, is described. Determining initial downlink and uplink payload transmit weights from the sequence of transmit beamforming sequences is described. Calculating a per-user transmit weight for a base station is also described. Predicting the expected channel quality, pathloss, and selection of signal modulation is described.

53 Claims, 16 Drawing Sheets

(51) Int. Cl.
  *H04B 7/06* (2006.01)
  *H04L 5/00* (2006.01)
(58) Field of Classification Search
  CPC .......... H04W 52/262; H04W 72/0473; H04W
    52/143; H04L 1/004; H04L 1/0045; H04L
    1/005; H04L 1/0057; H04L 1/0059; H04L
    1/0065; H04L 1/0071; H04L 25/022;
    H04L 25/0222; H04B 17/309; H04B
    7/2606
  See application file for complete search history.

(56) References Cited

U.S. PATENT DOCUMENTS

| | | | |
|---|---|---|---|
| 10,938,540 B2 | 3/2021 | Seo et al. | |
| 11,632,189 B1 | 4/2023 | Svantesson et al. | |
| 11,863,314 B1 | 1/2024 | Svantesson et al. | |
| 12,363,749 B2* | 7/2025 | Nurmela ............. | H04W 72/542 |
| 2007/0206695 A1 | 9/2007 | Ye et al. | |
| 2008/0058975 A1* | 3/2008 | Visuri ................. | H04L 25/0252 |
| | | | 700/100 |
| 2009/0097586 A1 | 4/2009 | Ko et al. | |
| 2010/0046445 A1 | 2/2010 | Sawahashi et al. | |
| 2010/0202561 A1 | 8/2010 | Gorokhov et al. | |
| 2011/0188388 A1* | 8/2011 | Ko ...................... | H04J 11/0053 |
| | | | 370/252 |
| 2012/0063336 A1 | 3/2012 | Shany et al. | |
| 2015/0163773 A1 | 6/2015 | Wang et al. | |
| 2016/0330643 A1 | 11/2016 | Sahin et al. | |
| 2017/0079051 A1 | 3/2017 | Sihlbom | |
| 2017/0134050 A1 | 5/2017 | Abu-Surra et al. | |
| 2017/0150482 A1 | 5/2017 | Chen et al. | |
| 2017/0366328 A1 | 12/2017 | Seo et al. | |
| 2017/0374637 A1 | 12/2017 | Akkarakaran et al. | |
| 2018/0205442 A1 | 7/2018 | Oteri et al. | |
| 2018/0279270 A1 | 9/2018 | Sano et al. | |
| 2019/0386727 A1* | 12/2019 | Jeon ...................... | H04B 7/088 |
| 2021/0314877 A1 | 10/2021 | Ryu et al. | |
| 2022/0053385 A1 | 2/2022 | Li et al. | |
| 2022/0053526 A1* | 2/2022 | Kang ................... | H04L 5/0044 |
| 2022/0150007 A1 | 5/2022 | Shariati et al. | |
| 2022/0190884 A1 | 6/2022 | Lea et al. | |
| 2022/0201672 A1* | 6/2022 | Tomeba ................ | H04W 16/28 |
| 2022/0345196 A1 | 10/2022 | Astrom et al. | |
| 2023/0081169 A1 | 3/2023 | Matsumura et al. | |
| 2024/0187080 A1 | 6/2024 | Ghanbarinejad et al. | |
| 2025/0249927 A1* | 8/2025 | Sadeghigooghari ........................ | |
| | | | B60W 60/001 |

OTHER PUBLICATIONS

Dahlman, Erik , et al., "4G: LTE/LTE-Advanced for Mobile Broadband", Orlando, FL, USA: Academic Press, Inc.,, 2011.
ISRWO for PCT Application PCT/US2025/032317 dated Oct. 27, 2025. pp. 1-35.

* cited by examiner

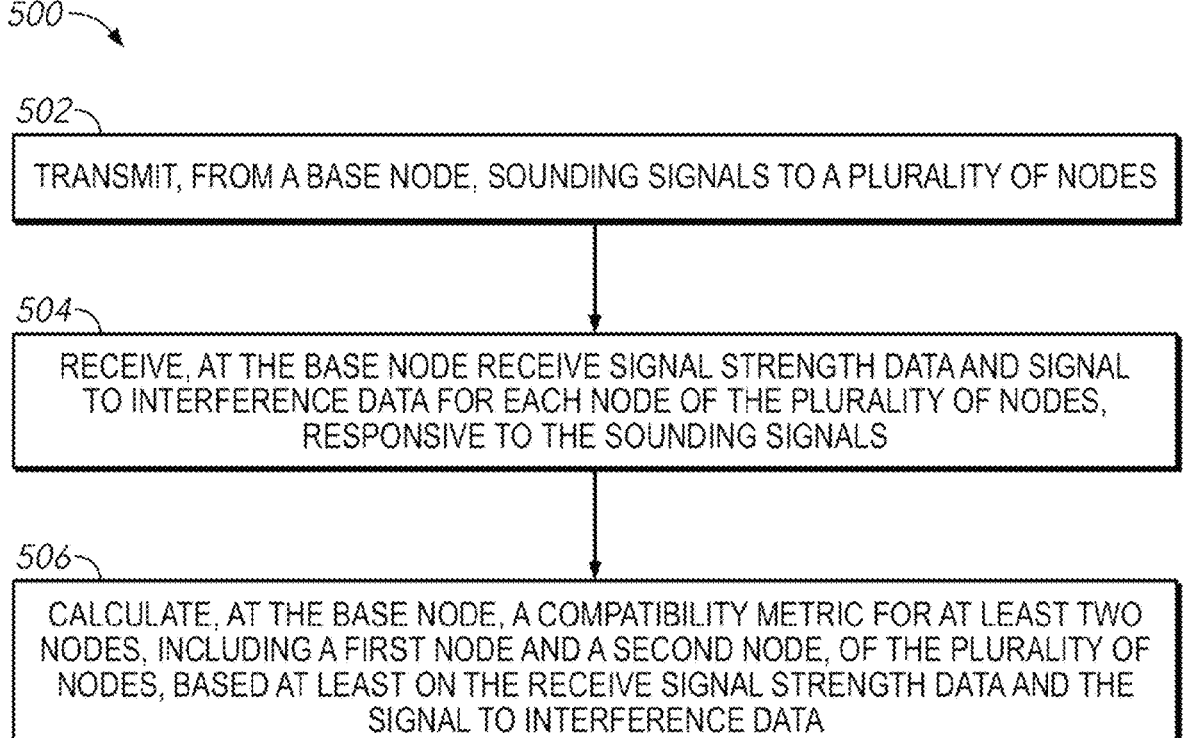

500

502

TRANSMIT, FROM A BASE NODE, SOUNDING SIGNALS TO A PLURALITY OF NODES

504

RECEIVE, AT THE BASE NODE RECEIVE SIGNAL STRENGTH DATA AND SIGNAL TO INTERFERENCE DATA FOR EACH NODE OF THE PLURALITY OF NODES, RESPONSIVE TO THE SOUNDING SIGNALS

506

CALCULATE, AT THE BASE NODE, A COMPATIBILITY METRIC FOR AT LEAST TWO NODES, INCLUDING A FIRST NODE AND A SECOND NODE, OF THE PLURALITY OF NODES, BASED AT LEAST ON THE RECEIVE SIGNAL STRENGTH DATA AND THE SIGNAL TO INTERFERENCE DATA

FIG. 5A

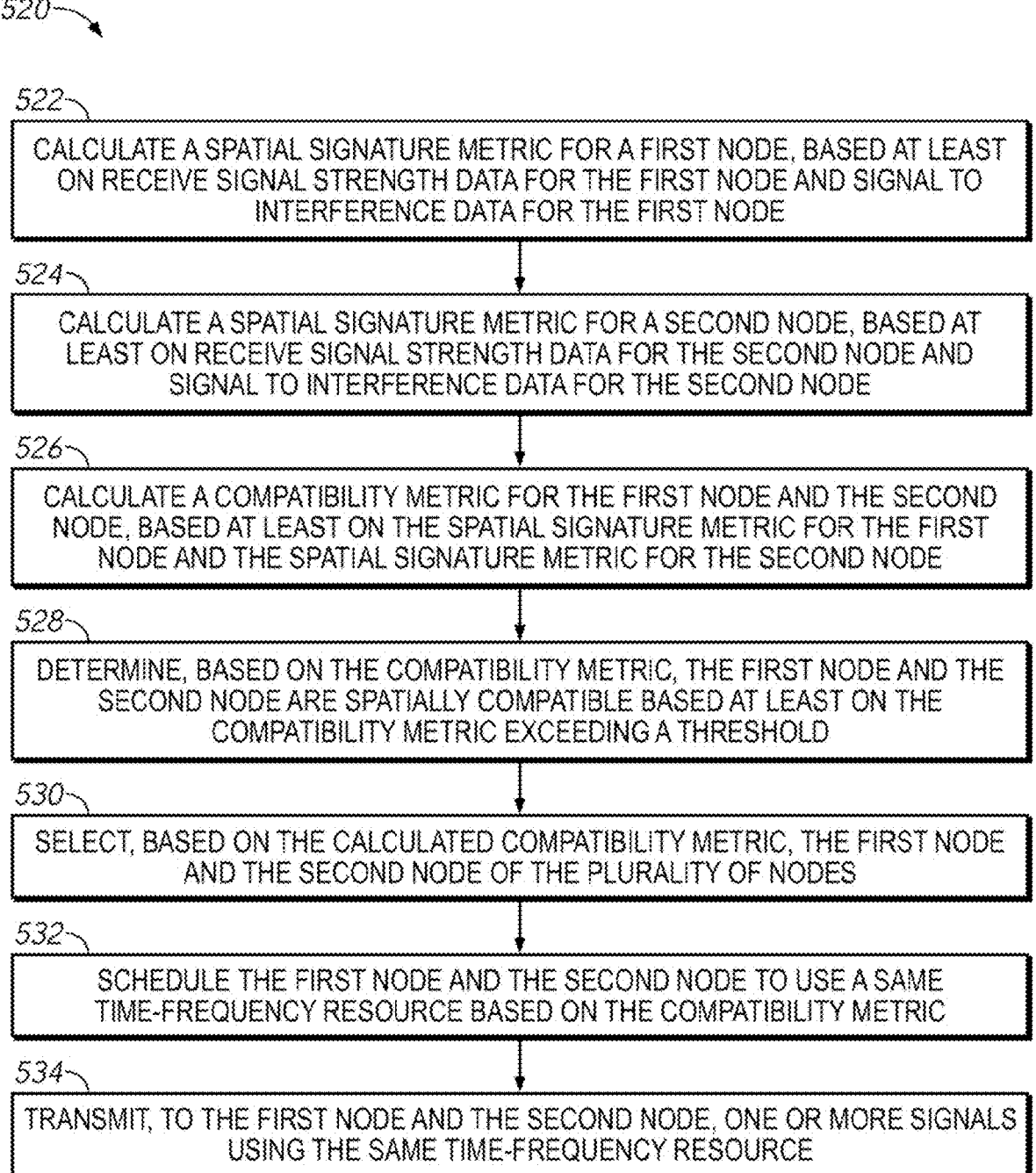

520

522 ─
CALCULATE A SPATIAL SIGNATURE METRIC FOR A FIRST NODE, BASED AT LEAST ON RECEIVE SIGNAL STRENGTH DATA FOR THE FIRST NODE AND SIGNAL TO INTERFERENCE DATA FOR THE FIRST NODE

524 ─
CALCULATE A SPATIAL SIGNATURE METRIC FOR A SECOND NODE, BASED AT LEAST ON RECEIVE SIGNAL STRENGTH DATA FOR THE SECOND NODE AND SIGNAL TO INTERFERENCE DATA FOR THE SECOND NODE

526 ─
CALCULATE A COMPATIBILITY METRIC FOR THE FIRST NODE AND THE SECOND NODE, BASED AT LEAST ON THE SPATIAL SIGNATURE METRIC FOR THE FIRST NODE AND THE SPATIAL SIGNATURE METRIC FOR THE SECOND NODE

528 ─
DETERMINE, BASED ON THE COMPATIBILITY METRIC, THE FIRST NODE AND THE SECOND NODE ARE SPATIALLY COMPATIBLE BASED AT LEAST ON THE COMPATIBILITY METRIC EXCEEDING A THRESHOLD

530 ─
SELECT, BASED ON THE CALCULATED COMPATIBILITY METRIC, THE FIRST NODE AND THE SECOND NODE OF THE PLURALITY OF NODES

532 ─
SCHEDULE THE FIRST NODE AND THE SECOND NODE TO USE A SAME TIME-FREQUENCY RESOURCE BASED ON THE COMPATIBILITY METRIC

534 ─
TRANSMIT, TO THE FIRST NODE AND THE SECOND NODE, ONE OR MORE SIGNALS USING THE SAME TIME-FREQUENCY RESOURCE

FIG. 5B

| SBP | SO 0 | SO 1 | SO 2 | ... | SO 14 | SO 15 |
|---|---|---|---|---|---|---|
| 0 | B0 | B1 | B2 | ... | B14 | B15 |
| 1 | B1 | B2 | B3 | ... | B15 | B0 |
| 2 | B2 | B3 | B4 | ... | B0 | B1 |
| 3 | B3 | B4 | B5 | ... | B1 | B2 |
| 4 | ... | ... | ... | ... | ... | ... |
| 14 | B14 | B15 | B0 | ... | B12 | B13 |
| 15 | B15 | B0 | B1 | ... | B13 | B14 |
| 16 | B0 | B1 | B2 | ... | B14 | B15 |
| ... | ... | ... | ... | ... | ... | ... |

Figure 13A:
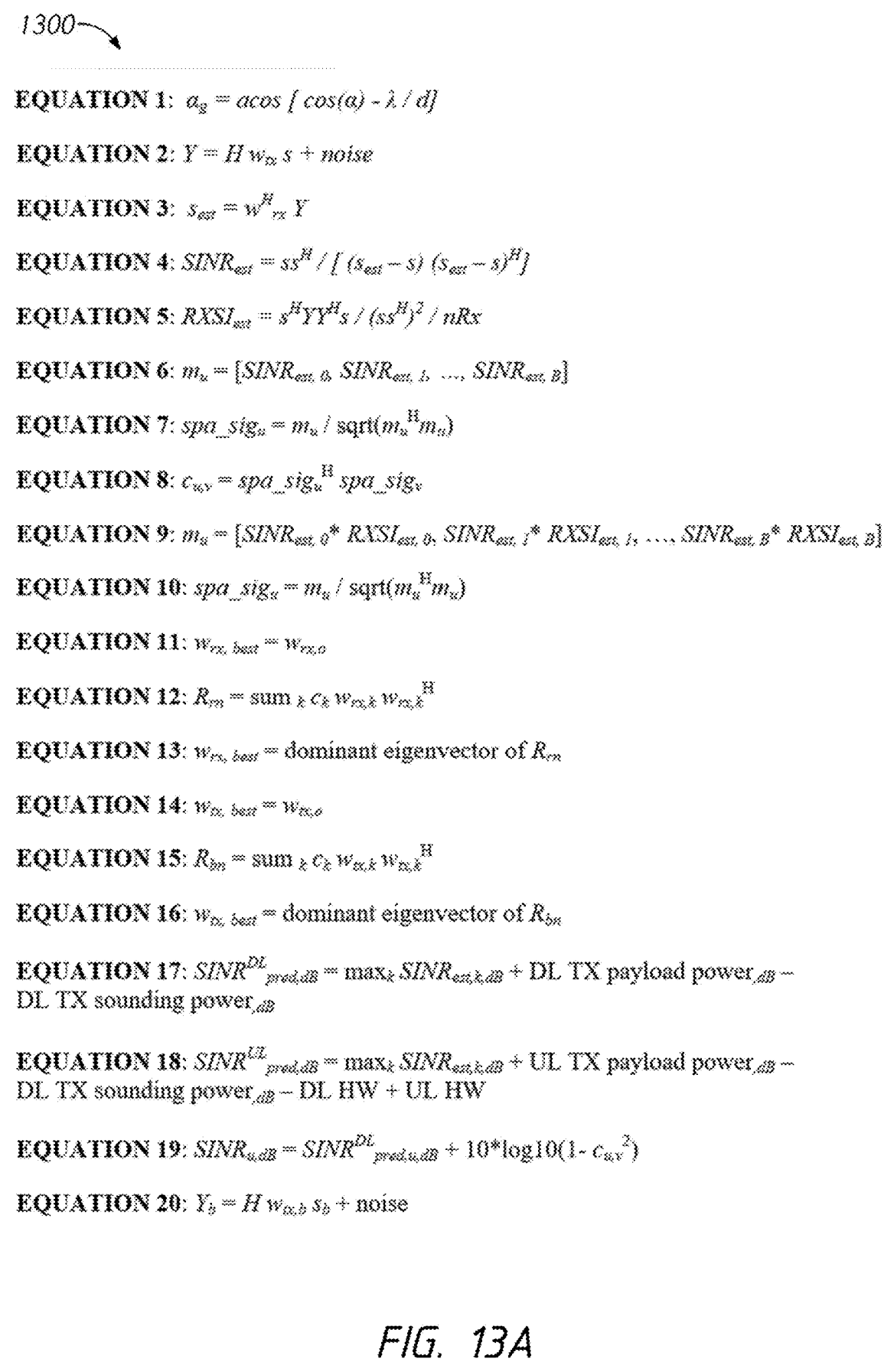

EQUATION 1: $a_g = acos \, [ \, cos(a) - \lambda / d ]$

EQUATION 2: $Y = H \, w_{tx} \, s + noise$

EQUATION 3: $s_{est} = w^H_{rx} \, Y$

EQUATION 4: $SINR_{est} = ss^H / [ \, (s_{est} - s) \, (s_{est} - s)^H ]$

EQUATION 5: $RXSI_{est} = s^H YY^H s / (ss^H)^2 / nRx$

EQUATION 6: $m_u = [SINR_{est, 0}, SINR_{est, 1}, ..., SINR_{est, B}]$

EQUATION 7: $spa\_sig_u = m_u / sqrt(m_u^H m_u)$

EQUATION 8: $c_{u,v} = spa\_sig_u^H \, spa\_sig_v$

EQUATION 9: $m_u = [SINR_{est, 0}* RXSI_{est, 0}, SINR_{est, 1}* RXSI_{est, 1}, ..., SINR_{est, B}* RXSI_{est, B}]$

EQUATION 10: $spa\_sig_u = m_u / sqrt(m_u^H m_u)$

EQUATION 11: $w_{rx, best} = w_{rx,0}$

EQUATION 12: $R_m = sum_k \, c_k \, w_{rx,k} \, w_{rx,k}^H$

EQUATION 13: $w_{rx, best} = $ dominant eigenvector of $R_m$

EQUATION 14: $w_{tx, best} = w_{tx,0}$

EQUATION 15: $R_{tm} = sum_k \, c_k \, w_{tx,k} \, w_{tx,k}^H$

EQUATION 16: $w_{tx, best} = $ dominant eigenvector of $R_{tm}$

EQUATION 17: $SINR^{DL}_{pred,dB} = max_k \, SINR_{est,k,dB} + $ DL TX payload power$_{dB}$ −
DL TX sounding power$_{dB}$

EQUATION 18: $SINR^{UL}_{pred,dB} = max_k \, SINR_{est,k,dB} + $ UL TX payload power$_{dB}$ −
DL TX sounding power$_{dB}$ − DL HW + UL HW

EQUATION 19: $SINR_{u,dB} = SINR^{DL}_{pred,u,dB} + 10*log10(1 - c_{u,v}^2)$

EQUATION 20: $Y_b = H \, w_{tx,b} \, s_b + noise$

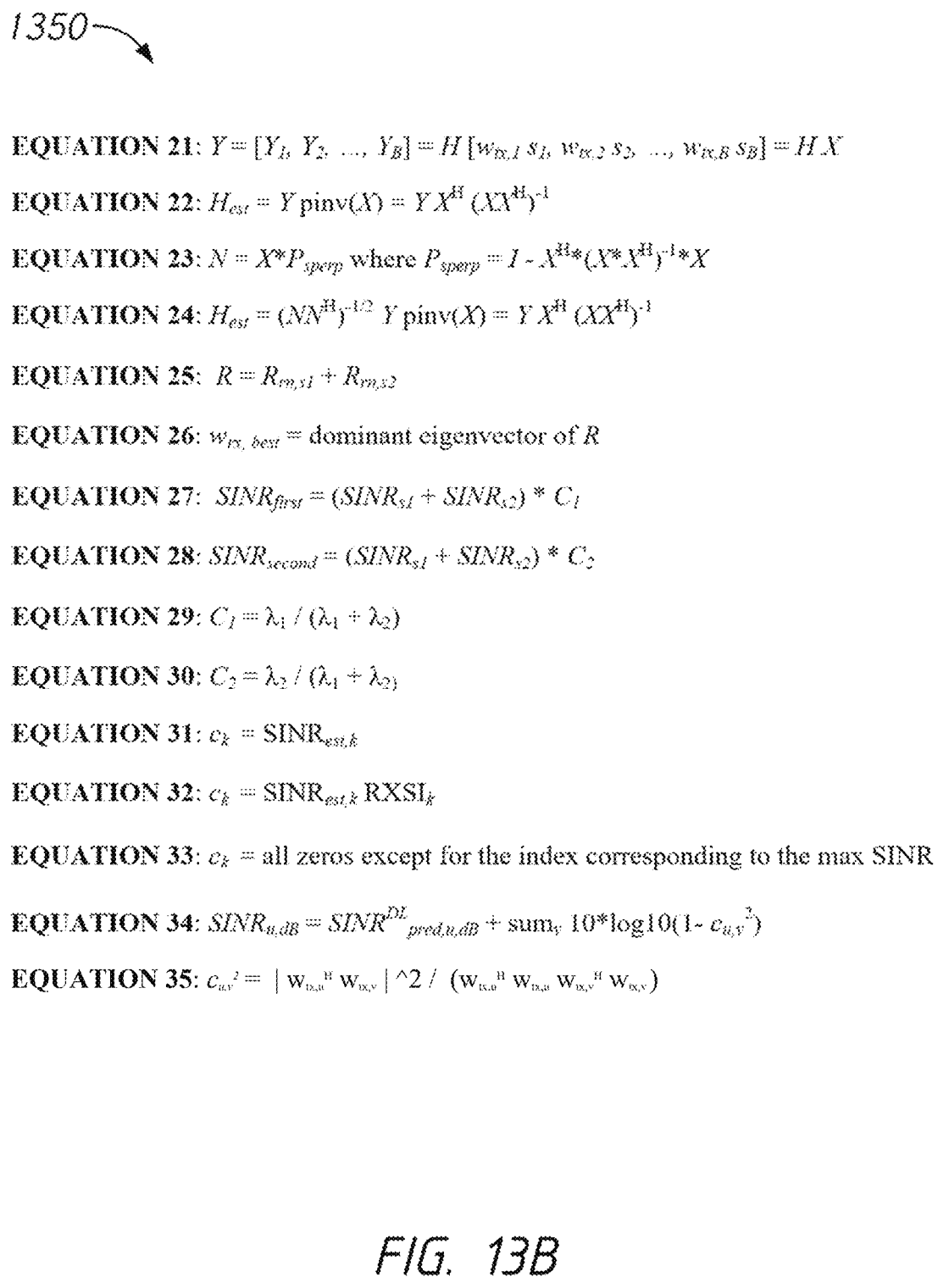

EQUATION 21: $Y = [Y_1, Y_2, ..., Y_B] = H [w_{tx,1} s_1, w_{tx,2} s_2, ..., w_{tx,B} s_B] = HX$

EQUATION 22: $H_{est} = Y \operatorname{pinv}(X) = Y X^H (XX^H)^{-1}$

EQUATION 23: $N = X^* P_{sperp}$ where $P_{sperp} = I - X^H * (X^* X^H)^{-1} * X$

EQUATION 24: $H_{est} = (NN^H)^{-1/2} \, Y \operatorname{pinv}(X) = Y X^H (XX^H)^{-1}$

EQUATION 25: $R = R_{rn,s1} + R_{rn,s2}$

EQUATION 26: $w_{rx,best} = $ dominant eigenvector of $R$

EQUATION 27: $SINR_{first} = (SINR_{s1} + SINR_{s2}) * C_1$

EQUATION 28: $SINR_{second} = (SINR_{s1} + SINR_{s2}) * C_2$

EQUATION 29: $C_1 = \lambda_1 / (\lambda_1 + \lambda_2)$

EQUATION 30: $C_2 = \lambda_2 / (\lambda_1 + \lambda_2)$

EQUATION 31: $c_k = SINR_{est,k}$

EQUATION 32: $c_k = SINR_{est,k} \, RXSI_k$

EQUATION 33: $c_k = $ all zeros except for the index corresponding to the max SINR

EQUATION 34: $SINR_{u,dB} = SINR^{DL}_{pred,u,dB} + \operatorname{sum}_v 10 * \log10(1 - c_{u,v}^2)$

EQUATION 35: $c_{u,v}^2 = | w_{tx,u}^H w_{tx,v} |^{\wedge}2 / (w_{tx,u}^H w_{tx,u} \, w_{tx,v}^H w_{tx,v})$

*FIG. 13B*

SYSTEMS AND METHODS FOR SPATIAL COMPATIBILITY DETERMINATION AND WEIGHT GENERATION USING BEAMFORMED SOUNDING SIGNALS

TECHNICAL FIELD

Examples described herein generally relate to wireless communication technology, including examples of fixed wireless communication technology.

BACKGROUND

When receiving with multiple antennas, such as in a multi-antenna wireless communication system including, in some examples, receivers, transmitters, and/or transceivers, the received signals from the different antennas may be combined to maximize the likelihood of correctly decoding the transmitted signal. Traditionally, there are many ways of combining the received signals including both linear and non-linear techniques. Linear receive combining can be represented as weighting the different antennas into a single stronger signal, e.g., applying receive weights. Transmitting with multiple antennas is similar in that the transmitted signal is mapped onto the antennas in different ways. A linear mapping can be viewed as transmitting the same signal on all antennas but weighted differently, e.g., applying transmit weights.

In many cases, there are multiple signals transmitted to different receivers at the same time and frequency. This is often called spatial multiplexing and care must be taken to have each receiver receive a strong desired signal and no or weak interfering signals. To achieve this, the transmitter may exploit information of the channel between transmitter and receivers. Most multi-antenna broadband wireless access systems gain this knowledge by having the transmitter transmit a known signal and all the receivers estimate their channel to the transmitter. In some examples, all of the receivers then send feedback to the transmitter what their channel was. That way, the transmitter has access to channel information when formulating transmit weights. This process is often called channel sounding or just sounding.

Multi-antenna broadband wireless access systems that schedule multiple users on the same time and frequency resource may desire to select users that are spatially compatible to avoid strong interfering signals at the receivers. For example, if a transmitter is located at the top of a tower, two neighboring houses on a street many miles away may have similar spatial channels. In that case, it may be difficult to weight the transmit antennas for each user (house) such that each user receives their intended signal without a significant leakage from the other. On the other hand, well separated houses may have substantially different spatial channels and it may be possible to construct transmit weights that avoid that interference.

Finding spatially compatible users is therefore important for system performance, but has traditionally been technically challenging to achieve. Similarly, techniques for finding the best transmit weights when serving multiple users at the same time and frequency resource are also important to enable high throughput and efficient use of resources, but has also traditionally been technically challenging to achieve.

BRIEF DESCRIPTION OF THE DRAWINGS

Reference is now made to the following descriptions taken in conjunction with the accompanying drawings, in which:

FIG. 5A is a flow diagram of a method 500 for determining a spatial compatibility metric for at least two nodes and transmitting to the at least two nodes using a same time-frequency resource, arranged in accordance with examples described herein;

FIG. 5B is a flow diagram of a method 520 for determining a spatial compatibility metric for least two nodes and transmitting to the at least two nodes using a same time-frequency resource, arranged in accordance with examples described herein;

FIG. 12 is a graphical illustration of table 1200 of beam index per sub-band pair (SBP) and sounding opportunity (SO), arranged in accordance with examples described herein;

FIG. 13A is a graphical illustration 1300 of equations 1-20, arranged in accordance with examples described herein; and FIG. 13B is a graphical illustration 1350 of equations 21-30, arranged in accordance with examples described herein.

DETAILED DESCRIPTION

Figure 1:
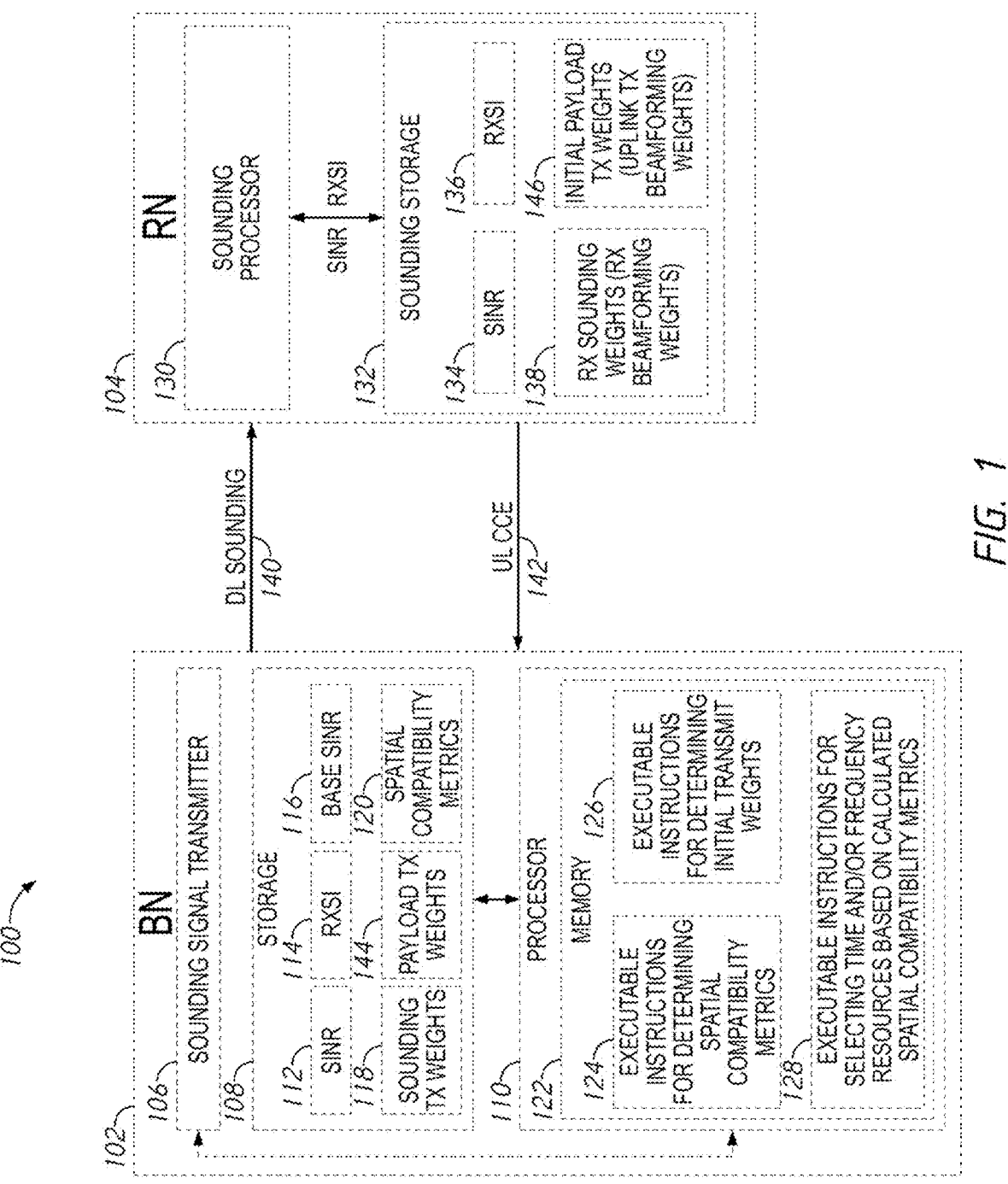
FIG. 1 is a schematic illustration of a system 100 for determining spatial compatibility of nodes and weight generation, arranged in accordance with examples described herein.

Certain details are set forth herein to provide an understanding of described embodiments of technology. However, other examples may be practiced without various ones of these particular details. In some instances, well-known computing system components, virtualization components, circuits, control signals, timing protocols, and/or software operations have not been shown in detail in order to avoid unnecessarily obscuring the described embodiments. Other embodiments may be utilized, and other changes may be made, without departing from the spirit or scope of the subject matter presented herein. The various embodiments disclosed herein are not necessarily mutually exclusive, as some disclosed embodiments can be combined with one or more other disclosed embodiments to form new embodiments.

In some examples, wireless communication technology described herein may be multi-antenna broadband wireless access systems with dynamic user allocations in either time, and/or frequency, and/or spatial dimensions. Examples of broadband wireless access systems include, but are not limited it, 5G-New Radio (NR), Long-Term-Evolution (LTE), WiMAX systems, and TARANA'S® G1 system. Examples of wireless communication technology that perform spatial compatibility determination are described, and may be used in time-division-duplex (TDD) retro-directive beamforming (RDB) broadband wireless communications (e.g., access) systems, and/or other wireless communications (e.g., access) systems. Some examples determine a compatibility metric for at least two nodes by transmitting sounding signals (e.g., a sequence of beamformed sounding signals) from a base node to a plurality of (remote) nodes, including a first node and a second node. Some examples determine a spatial compatibility metric for the at least two nodes by receiving sounding feedback data and/or information for each node of the plurality of nodes in a wireless communication and/or spatial compatibility system. In some examples, sounding feedback may include, but may not be limited to, signal strength data and/or signal-to-interference data for each node of the plurality of nodes in a wireless communication and/or spatial compatibility system. Some examples determine a compatibility metric for at least two nodes based on the receive signal strength data and the signal-to-interference data. Some examples utilize the calculated spatial compatibility metric to select which of the at least two nodes to schedule using the same time resource and/or the same frequency resource, e.g., a same time-frequency resource; a same time-frequency-space resource; and/or a same resource associated with a combination of time, frequency, and/or space. Some examples transmit one or more data signals to the at least two nodes using the same time-frequency resource based on the calculated spatial compatibility metric. Some examples transmit one or more data signals to the at least two nodes using transmit weights. Some examples calculate the transmit weights based at least on receive weights received from a plurality of (remote) nodes, including in some examples, the at least two nodes. As should be appreciated, while scheduling at least two nodes using a same time-frequency system is discussed throughout, it should be appreciated that scheduling more than two nodes using a same time-frequency-space resource using the systems and methods described herein is considered to be within the scope of this disclosure. In some examples, based at least on the spatial compatibility metric, a base node may schedule the at least two nodes using the same time-frequency-space resource, and may in some examples, schedule three or more nodes, using the same-time frequency-space resource.

Due in part to drawbacks of existing systems, it may be desirable to be able to determine which nodes (e.g., remote nodes) within a wireless communications system are spatially compatible with each other in order to schedule data signals to the nodes using the same time-frequency resource. Accordingly, examples described herein include different methods, techniques, and/or algorithms for finding spatially compatible users. Examples described may, in some examples, be designed for multi-user time division duplex (TDD) retro-directive beamforming (RDB) broadband wireless access systems with dynamic allocations in time, frequency, and space (spatial multiplexing of multiple users).

It should be appreciated that, while examples described herein are applicable to TDD retro-directive beamforming (RDB) systems with, in some examples, dynamic allocations in time, frequency, and/or spatial multiplexing of multiple users in general, such example implementation(s) are used to facilitate understanding. Examples described herein may generally focus on the physical (PHY) layer but some aspects from the medium-access (MAC) layer are described as well. Other implementations and/or wireless communications systems for which spatial compatibility determinations and/or transmission of signals (e.g., data signals) to nodes (e.g., remote nodes) using the same time-frequency resource(s) is contemplated to be within the scope of this disclosure.

Traditionally, most broadband wireless access systems such as 5G-NR or LTE transmit a broadcast signal containing a channel sounding signal from a base station (BS) or base node (BN) to many user equipment (UE) nodes or residential nodes (RNs). Many UEs or RNs estimate channel metrics based on that sounding signal and feed that back to the base station. Uses of those channel metrics include, but are not limited to, (1) determining which user that can be scheduled on the same time and frequency resource, i.e. which users are spatially compatible; (2) calculating the per-user transmit weights for the base station; and, (3) predicting the expected channel quality, pathloss, and selection of signal modulation. The selection of sounding signal and processing may be different for each of the use cases described above, and on the system requirements such as the number of antennas at the BN and the RN.

The use of the sounding channel to determine transmit weights depends on the system. For systems where the downlink (e.g., transmit) and uplink (e.g., receive) occurs at different frequencies, the sounding channel may be the primary source of information to calculate transmit weights. For systems where the downlink and uplink occurs at the same frequency, the principle of channel reciprocity may be used in addition to the sounding channel to compute transmit weights. Using reciprocity, the spatial structure of the received signal can be used to decide the spatial structure of the transmitted signal. For example, if the received signal impinging on the receiving antenna array comes primarily from one direction, the transmitter may then transmit back in the same direction. This may be called retro-directive beamforming (RDB). Both analog and digital forms for RDB are possible but the examples herein focus on a digital implementation.

The characteristics of the radio channel typically are frequency dependent, RDB is often implemented for TDD systems where both transmissions from the RN to the BN or from the BN to the RN use the same frequency so the receive beamforming weights can be used to derive the transmit beamforming weights. However, even in the case of RDB, channel sounding is important since for the first transmission, there is no previous received signal to base the transmit weights on. For RDB systems, with dynamic scheduling in time and frequency, allocations are frequently started and ended resulting in many cases when there is no previous received signal.

Figure 6:
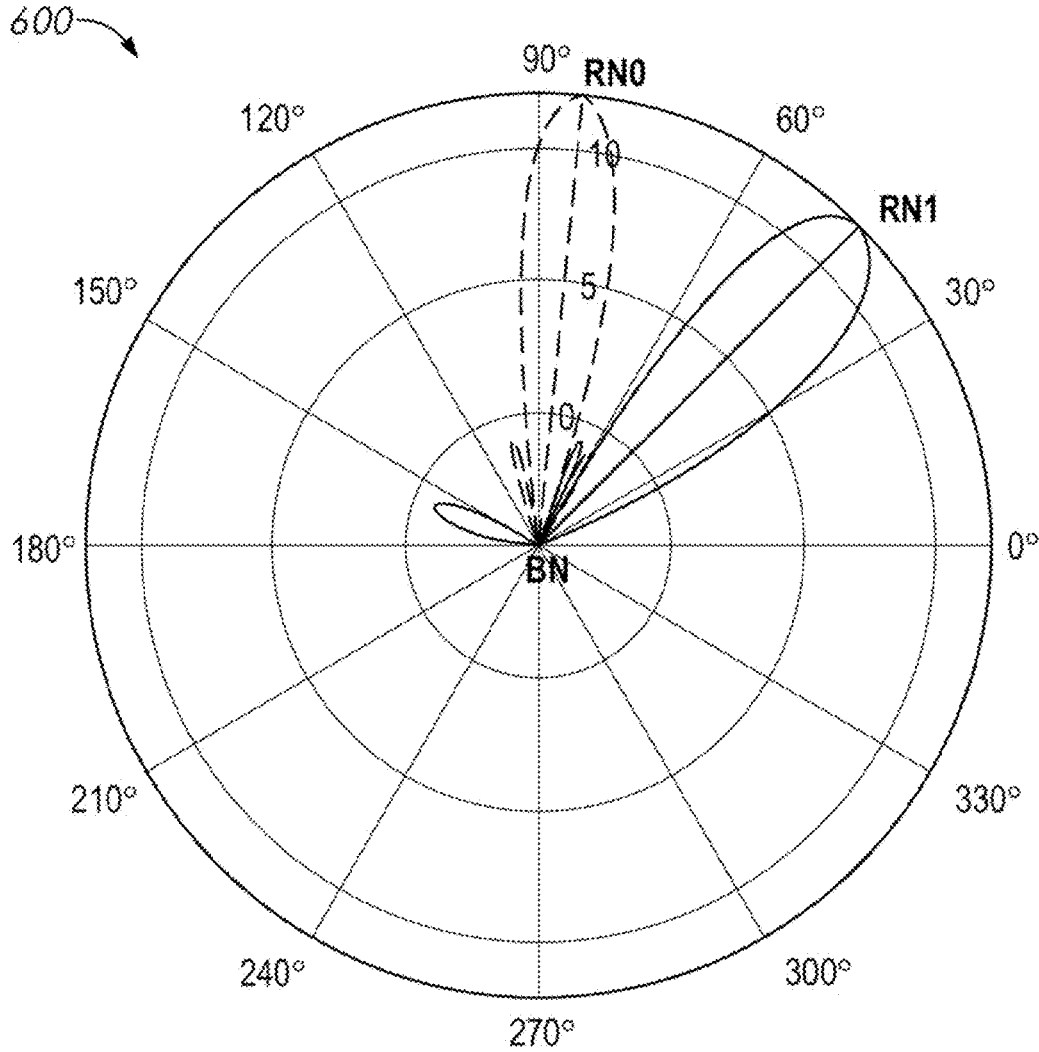
FIG. 6 is a graphical illustration 600 of beams to two users, arranged in accordance with examples described herein.

In some examples, it may be important to not create interference among the users when serving multiple users at the same time and frequency resource using multiple antennas, e.g., spatial multiplexing. For example, FIG. 6 is a graphical illustration of beams of two users. More specifically, FIG. 6 illustrates a base station (e.g., a base node; a central node, etc.) serving two RNs, where $RN_0$ is located at 85 degrees (85°) relative to the BNs array axis and $RN_1$ at 45 degrees (45°). When the BN forms the blue beam to transmit towards $RN_0$, very little of that energy arrives at $RN_1$ causing little interference for $RN_1$. Similarly, when the BN forms the red beam towards $RN_1$, very little of that energy arrives at $RN_0$ causing little interference for $RN_0$. In this case, the RNs are widely separated and the two RNs may be considered spatially compatible.

Figure 7:
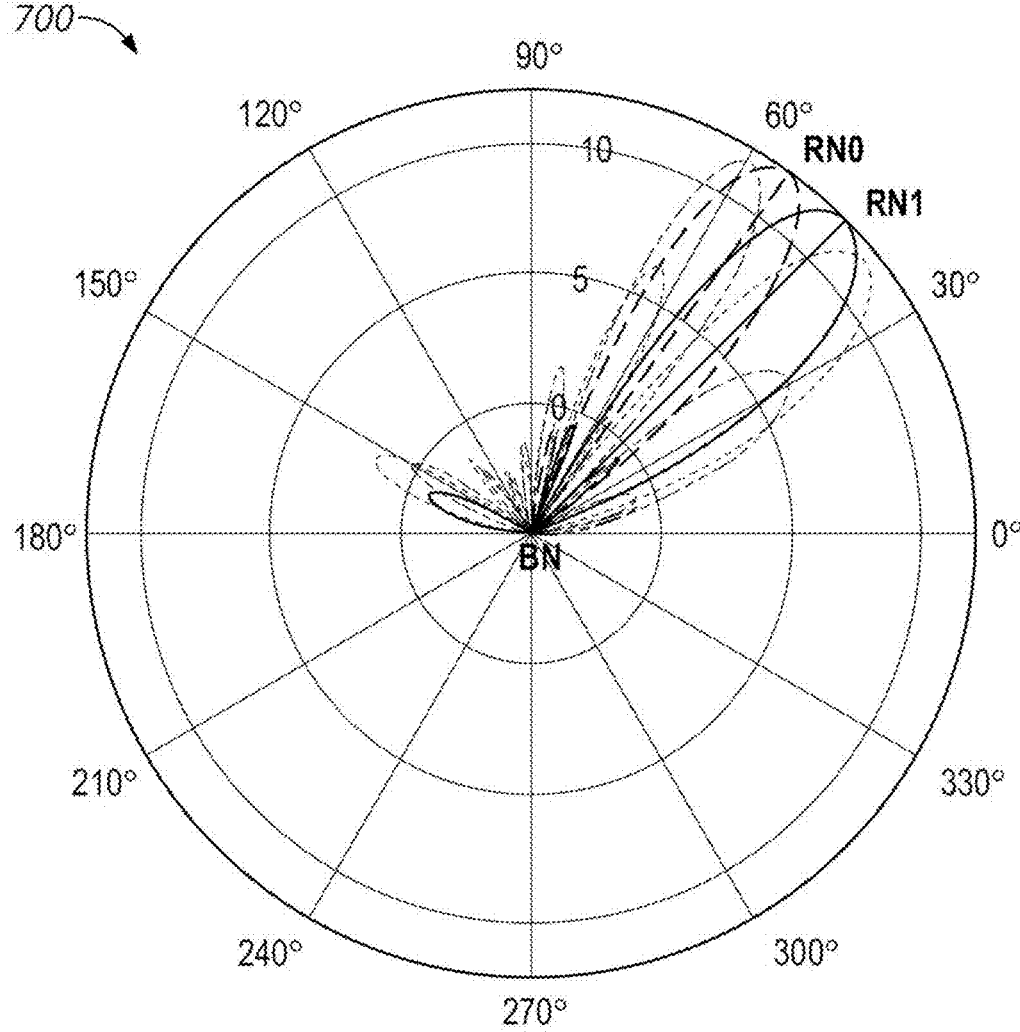
FIG. 7 is a graphical illustration 700 of beams to two users, arranged in accordance with examples described herein.

Consider instead FIG. 7, which is a graphical illustration of beams for two users. More specifically, FIG. 7 illustrates a base station (e.g., a base node; a central node, etc.) where $RN_0$ is located at 55 degrees (55°) relative to the BNs array axis and $RN_1$ at 45 degrees (45°). When the BN forms the blue beam to transmit towards $RN_0$, a substantial amount of that energy arrives at $RN_1$ causing interference for $RN_1$. Similarly, when the BN forms the red beam to transmit towards $RN_1$, a substantial amount of that energy arrives at $RN_0$ causing interference for $RN_0$. In this case, the RNs are closely spaced, and the two RNs may be considered spatially incompatible. This may be representative of neighboring houses on the same street a couple of miles away from an elevated BN.

If the BN has detailed channel knowledge, it can compute a different type of transmit weight that factors in the other user by dramatically lowering the amount of energy in that direction. This is often called placing nulls in the direction of other users. An example of that is also showed in FIG. 7 where the dashed blue curve represents the beam towards $RN_0$ while placing a null towards $RN_1$. Similarly, the dashed red curve represents the beam towards $RN_1$ while placing a null towards $RN_0$. In this case, little energy is received at the other RN but the main peak shifts causing lower energy to be delivered to the target RN. For example, the dashed blue curve is a couple of dBs lower at $RN_0$ than the solid blue curve. This is another measure of spatial compatibility.

If scheduling $RN_0$ and $RN_1$ on the same time and frequency resource, the signal quality at those RNs will be lower either through increased interference or lower desired signal power. It is important to note that the null is narrower than the beam itself in FIG. 7. In fact, placing an accurate null requires much more precise channel information than the requirement to be able to place a beam towards a desired direction. If $UE_1$ and $UE_2$ are too close, it may not be possible to serve both UEs at the same time and the two UEs are declared incompatible. In FIGS. 6 and 7, the location of the beams largely determines the spatial compatibility and since the beams are relatively broad, the spatial compatibility decision may require less precise channel information than determining transmit weights forming nulls. Thus, a primary use of the channel information may impact the choice of sounding signal.

A common problem in wireless access, and wireless communication systems, is interference, which may be caused by other wireless transmitters nearby. This may be particularly a problem in unlicensed parts of a radio frequency band but may also be a problem in any band. If the channel sounding through a broadcast channel is received in the presence of interference it may, in some examples, significantly impact the estimated channel and thus also the calculated transmit weights and spatial compatibility. For example, this is a common challenge and limitation of channel state information (CSI) feedback at the cell edge where the UE's or RN's estimation of the channel ends up being interference dominated. Designing a scheme that is robust in interference is thus important for increased and/or reliable system performance. At the same time, the scheme should also work for longer links where the signal strength is low and/or where the noise may limit performance.

In some examples, consider an orthogonal frequency-division multiple access (OFDMA) RDB system where the allocation unit is a sub-band or sub-band pair that is defined as a group of consecutive sub-carriers. In some examples, the size of a sub-band or sub-band pair is typically selected such that the channel conditions are similar within that bandwidth. Computing transmit weights and predicting channel quality may be performed, in some examples, on a sub-band or sub-band pair level due to the more precise requirements while the spatial compatibility may be computed over a larger band.

An example of a sounding scheme for a system with nTx transmit antennas and nRx receive antennas, is to transmit from one antenna at a time and receive with all antennas recording the channel coefficient from transmit antenna "i" to receive antenna "j," per sub-band. Note that this scheme may be implemented by utilizing all transmit antennas at the same time and/or frequency but each using a separate sequence to separate the antennas out. Using separate sequences may, in some examples, eliminate traditional transmit beamforming capabilities and potential transmit beamforming gains. After sweeping all nTx transmit antennas, an nRx×nTx matrix H per sub-band may be formed that describes the channel at that sub-band or sub-band pair.

In some examples, this scheme gives full channel information but suffers from the fact that the receiver cannot spatially cancel interference since it is computing the channel coefficient per antenna and thus cannot combine the receive antennas to suppress interference. Correspondingly, when transmitting from one transmit antenna at a time, no transmit beamforming may be performed. Hence, with such a scheme, no transmit nor receive beamforming gain is obtained and no interference cancellation is possible. This creates an imbalance between the sounding scheme and normal payload transmissions that may enjoy both beamforming gains and interference cancellation capabilities. Hence, this choice of sounding scheme may limit range and deployment scenarios. The benefits are that the full channel matrix that can be fed back to the transmitter to compute spatial compatibility, transmit weights, and predict channel quality directly from the channel.

Another example of a sounding scheme is to form a sequence of beams that scans the area that the BN serves in a manner like a light house sending a beacon of light in different directions. A benefit of this scheme may be that the signal quality at the receiver may be improved due to transmit beamforming. If the receiver, furthermore, performs receive beamforming by combining the signal at the receive antennas, interference cancellation and receive beamforming gains may be achieved.

On the other hand, there are several drawbacks since the channel coefficients from each transmit antenna to each receive antenna are no longer directly available. For example, (1) spatial compatibility can no longer be computed from the full channel matrix H; (2) signal quality can no longer be estimated from the full channel matrix H; and, (3) transmit weights cannot directly be obtained from the full channel matrix H.

Fortunately, these drawbacks of traditional systems may be resolved and/or ameliorated in some examples using the systems and methods described herein, while enjoying the benefits of transmit and receive beamforming gains while being able to cancel interference. As should be appreciated, there are a number of technical advantages and benefits associated with the systems and methods described throughout. Accordingly, examples described herein include methods, techniques, and/or algorithms for determining spatially compatible users, e.g., within a communication system. Examples described may, in some examples, be designed for multi-user time division duplex (TDD) retro-directive beamforming (RDB) broadband wireless access systems with dynamic allocations in time, frequency, and space (spatial multiplexing of multiple users).

In some examples, and as described herein, for spatial compatibility, instead of directly relying on the knowledge of the full channel properties through the nRx×nTx matrix H, the sequence of beams that provide knowledge of the spatial properties may be used to determine spatial compatibility. For example, recording the resulting signal to interference data and noise ratio (SINR) at the receiver for each beam index contains knowledge of the spatial properties. By feeding (e.g., transmitting) that information from the receiver (e.g., remote node) back to the transmitter (e.g., central node, base node, computing node, etc.), the transmitter (e.g., remote node) can use said information to determine spatial compatibility. Additional metrics such as the receive signal strength (e.g., receive signal strength data) and/or other data described herein, may additionally and/or alternatively be used to further improve performance of the system, including to determine spatial compatibility and/or other metrics.

In some examples, and as described herein, for predicting the signal quality for normal payload, the same metrics such as SINR and received signal strength may be used if both the sounding and payload are beamformed in a similar manner. For example, the SINR of the downlink (DL) payload channel from the BN to an RN can be directly extrapolated from sounding. If the transmit and receive beamforming gains are similar for sounding and payload, an accurate estimate may be obtained by compensating for possible transmit power and changes in hardware (HW) factors such a gain and noise levels between the sounding instance and payload transmission time. The uplink (UL) payload channel SINR may be estimated in a similar manner. The required payload transmit power to achieve certain receive signal strength or SINR may also be computed from the same information.

In some examples, and as described herein, for computing transmit weights, the computation depends on the link direction and the type of system. Results from the receive processing may be used in RDB systems (and in some examples, TDD systems) to compute RN transmit weights for the UL. For example, the RN may choose to combine the sounding receive weights from the different beams for find the dominant propagation path. One example of this is to compute an SINR weighted average across the different beams. In some examples, another example is to construct a subspace of the outer products of the SINR weighted receive vectors and use the dominant part of that space as the transmit weights after performing calibration between transmit and receive hardware paths. For computing the BN's DL transmit weights, a similar scheme may be used where instead of SINR weighting the RNs receive vectors, the BN may SINR weight the different transmit weights generating the sequence of beams. Yet more precise channel information may be achieved through RN post-processing of the full sequence of received signals across the sequence of beams to estimate the full channel matrix H. A drawback of that is that less interference cancellation is possible but it does provide transmit beamforming and some noise suppression that represents a substantial improvement over the initial example of transmit one antenna at a time and receiving one antenna at a time.

In some examples, and as described herein, sounding schemes (e.g., techniques, methods, etc.) are applicable to both RDB systems and frequency-division-duplex (FDD) systems operating the downlink and uplink at different frequencies but in slightly different ways. Reciprocity may be used in RDB systems to determine properties in the reverse link direction such as computing transmit weights and predicting channel quality. In some examples, for non-RDB systems, spatial compatibility and signal quality for the DL direction may still be computed from DL sounding. For the UL direction, the above sounding schemes may be amended with other techniques such as UL sounding. In some examples, in RDB systems (e.g., TDD systems), one or more base nodes and one or more remote nodes may use the same frequency. In some examples, in non-RDB (e.g., FDD systems) one or more base nodes and one or more remote nodes may transmit at different frequencies. In such non-RDB (e.g., FDD systems), the one or more remote nodes may transmit sounding (e.g., to the one or more base nodes) using UL sounding.

In this way, examples described herein facilitate and/or enable determining which nodes (e.g., remote nodes) within a wireless communications system are spatially compatible with each other in order to schedule data signals to the nodes using the same time-frequency resource. Examples described herein facilitate and/or enable the determination of initial transmit weights used by a base node when sending signals (e.g., sounding signals, data signals, a sequence of beamformed sounding signals) to one or more remote nodes of the communications system.

FIG. 1 is a schematic illustration of a communication system 100 for determining spatial compatibility of nodes and weight generation, arranged in accordance with examples described herein. As described herein, system 100 of FIG. 1 is a system for channel sounding, and may include multiple transceivers, including base node 102 and remote node 104. While not shown, each of the multiple transceivers, including base node 102 and remote node 104 may, in some examples, include one or more antennas for transmitting and/or receiving signals, such as data signals.

Base node 102 may include sounding signal transmitter 106, storage 108, and processor 110. Storage 108 (e.g., sounding storage) may include one or more metrics and/or data and/or information, such as SINR 112, RXSI 114, Base SINR 116, sounding transmit weights 118, spatial compatibility metrics 120, and payload transmit weights 144. Processor 110 may include memory 122. Memory 122 may include one or more executable instructions, such as executable instructions for determining spatial compatibility metrics 124; executable instructions for determining initial transmit weights 126; and, executable instructions for selecting time and/or frequency resources based on calculated spatial compatibility metrics 128.

Remote node 104 may include a sounding processor, such as sounding processor 130, and sounding storage, such as sounding storage 132. Sounding storage 132 may include one or more metrics and/or data and/or information, such as SINR 134, RXSI 136, receive sounding weights 138, and initial payload transmit weights 146.

The components shown in FIG. 1 are examples. It should be understood that additional, fewer, and/or alternative components may be used in other examples. Generally, components shown and described with reference to FIG. 1, which perform processing, calculating, or other data manipulations, may be understood to be implemented in hardware, software, or combinations thereof. For example, the sounding signal transmitter and/or the sounding processor, and/or other components of system 100 may be implemented using one or more processors and memory encoded with executable instructions for performing their functions (e.g., software). In some examples, one or more application specific integrated circuits (ASICs), field programmable gate arrays (FPGAs), systems on a chip (SOCs), or other logic may be used. Any electronic storage may be used to store metrics or other parameters described herein (e.g., spatial compatibility metrics, SINR, RXSI, Base SINR, initial transmit weights, initial receive weights, transmit weights, receive weights), such as any kind of memory.

Further, while a single base node and a single remote node are shown in FIG. 1, it should be understood that additional and/or alternative nodes, in some examples, may be present in system 100, and may perform additional and/or alternative functions described herein. In some examples, a single base node (e.g., central node, computing node, etc.) may be present in system 100, while one or more remote nodes are present. In some examples, system 100 may include remote node 104 and another remote node, which may together constitute the at least two nodes discussed herein. In some examples, system 100 may include a base node, and a first remote node and a second remote node. In some examples, the system 100 may include a plurality of nodes, including a base node and at least two nodes. In some examples, the at least two nodes described herein may be a node pair. In some examples, base node 102 may calculate (e.g., determine, etc.) a compatibility metric for remote node 104 and the another remote node not shown. In some examples, base node 102 may calculate (e.g., determine, etc.) a compatibility metric for at least two other nodes (e.g., at least two remote nodes, two computing nodes, etc.) in system 100. In some examples, base node 102 may calculate (e.g., determine, etc.) a compatibility metric for more than two nodes, for example, for three or more nodes.

Examples described herein may include one or more base nodes, such as base node 102, which may be intended to communicate wirelessly to one or more other communications nodes (e.g., residential nodes, remote nodes, etc.). A base node may, for example, be positioned on a tower or other centralized location. A residential (remote) node may be particular to a building, home, office, or other location. The residential node may in turn be in communication with one or more electronic devices and may facilitate communication between the electronic devices and the base node. Any number or type of electronic device may be serviced using communication techniques described herein including, but not limited to, computing systems, servers, desktops, laptops, tablets, cellular phones, appliances, vehicles, etc.

Examples of base nodes as described herein may further include sounding signal transmitters, such as sounding signal transmitter 106, may generally be configured to transmit one or more sounding signals (e.g., a sequence of beamformed sounding signals), one or more sounding sequences, one or more data signals, and/or one or more transmit and/or receive weights. In some examples, sounding signal transmitter 106 may be configured to transmit one or more signals described herein using an antenna and/or an antenna array, such as one or more of the antennas of base node 200 of FIG. 2. Sounding signal transmitter 106 may be communicatively coupled to one or more components, such as storage 108, processor 110, and/or any additional and/or alternative components of base node 102, whether shown or not shown.

Examples of base nodes described herein may further include storage, such as storage 108. Storage 108 may generally be and/or include any form of memory and/or storage, such as a solid state drive (SSD), hard disk drive (HDD), Non-Volatile Memory Express (NVMe) drive, and the like, configured to store data and or metadata, such as spatial compatibility metrics, SINR, RXSI, Base SINR, initial transmit weights, initial receive weights, transmit weights, receive weights, channel metrics, and/or any additional and/or alternative data and/or metadata relevant to determining spatial compatibility metrics and/or determining initial transmit weights and/or performing any other operations relevant to system 100. In some examples, storage 108 may include data and/or metadata received from a user of a base node, such as base node 102. In some examples, storage 108 may include data and/or metadata received from one or more remote nodes, such as remote node 104 and/or other remote nodes (not shown). In some examples, storage 108 may include data and/or metadata from remote nodes served by base nodes other than and/or in addition to base node 102 of system 100. In some examples, base node 102 may receive such information via one or more interfaces, including via different interfaces, such as, for example, inter-base node (inter-BN) interfaces in which a base node may communicate with one or more other base nodes. In some examples, interfaces may refer to boundaries and/or connection points between different nodes. In some examples, interfaces may facilitate the exchange of data and/or signals, and/or other information, enabling communication and/or coordination between nodes, e.g., between nodes within systems described herein. In some examples, interfaces may include physical interfaces, logical interfaces, and/or software interfaces. Logical interfaces may include but are not limited to protocols and standards such as Wi-Fi or Bluetooth, which in some examples may define how nodes (e.g., devices, network elements, etc.) communicate without requiring physical connections. Software interfaces may include but are not limited to APIs (Application Programming Interfaces) used in some examples by applications to interact with wireless hardware or network protocols, facilitating data exchange and control. In some examples, storage 108 may include data and/or metadata calculated and/or determined at base node 102. In some examples, storage 108 may include data and/or metadata not used in determining spatial compatibility metrics and/or initial transmit weights. In some examples, storage 108 may be updated to include additional data and/or metadata, such as with additional metrics and/or data and/or metadata received from one or more remote nodes, such as remote node 104. In some examples, storage 108 may be updated to include additional metrics, such as additional compatibility metrics, determined at the base node. In some examples, storage 108 may include one or more metrics and/or data and/or information, such as SINR 112, RXSI 114, Base SINR 116, sounding transmit weights 118, spatial compatibility metrics 120, and payload transmit weights 144. Storage 108 may be communicatively coupled to one or more components, such as sounding signal transmitter 106, processor 110, and/or any additional and/or alternative components of base node 102, whether shown or not shown. In some examples, storage 108 may include data and/or metadata regarding which of the at least two nodes of the plurality of nodes of system 100 may be selected or have been selected for sending signals (e.g., data signals, etc.) to via the same time-frequency resource. In some examples, storage 108 may include data and/or metadata regarding which of the at least two nodes of the plurality of nodes of system 100 may be scheduled or have been scheduled for sending signals (e.g., data signals, etc.) to via the same time-frequency resource. In some examples, storage 108 may include data and/or metadata regarding joint scheduling of two or more nodes to schedule the transmission of signals to using the same time-frequency resource, respectively.

Examples of base nodes described herein may further include one or more processors, such as processor 110. Any kind and/or number of processors may be present in base node 102, including one or more central processing unit(s) (CPUs); graphics processing units (GPUs); other computer processors, mobile processors, digital signal processors (DSPs), microprocessors, computer chips; and/or other processing units configured to execute instructions, such as executable instructions for determining spatial compatibility metrics 124; executable instructions for determining initial transmit weights 126; and/or, executable instructions for selecting time and/or frequency resources based on calculated spatial compatibility metrics 128.

Examples of base nodes described herein may further include memory, such as memory 122. Any type or kind of memory may be present (e.g., read-only memory (ROM), random access memory (RAM), SSD, and secure digital card (SD card)). While a single box is depicted as memory 122, any number of memory devices may be present in base node 102. The memory 122 may be in communication (e.g., electrically connected, electrically coupled, communicatively coupled, etc.) to processor 110. Memory 122, as described herein, may store executable instructions for execution by the processor 110, such as executable instructions for determining spatial compatibility metrics 124; executable instructions for determining initial transmit weights 126; and/or, executable instructions for selecting time and/or frequency resources based on calculated spatial compatibility metrics 128. In some examples, processor 110 and/or memory 122 may be communicatively coupled to one or more components, such as sounding signal transmitter 106, storage 108, and/or any additional and/or alternative components of base node 102, whether shown or not shown.

In some examples, one or more base nodes described herein, such as base node 102, may be configured to communicate with one or more remote nodes (e.g., residential nodes, etc.) described herein, such as remote node 104. In some examples, base node 102, may be configured to communicate DL sounding signals (e.g., a sequence of beamformed sounding signals) to remote node(s), such as remote node 104, at DL sounding 140. In some examples, remote node 104 may be configured to communicate SINR and/or RXSI via UL CCE to base node(s), such as base node 102, at UL CCE 142.

Examples described herein may include one or more remote nodes, such as remote node 104, which may be intended to communicate wirelessly to one or more other communication nodes (e.g., base node, centralized node, etc.). A base node may, for example, be positioned on a tower or other centralized location. A residential (e.g., remote) node may be particular to a building, home, office, or other location. The residential node may in turn be in communication with one or more electronic devices and may facilitate communication between the electronic devices and the base node. Any number or type of electronic device may be serviced using communication techniques described herein including, but not limited to, computing systems, servers, desktops, laptops, tablets, cellular phones, appliances, vehicles, etc. Additionally, examples of remote nodes described herein may include but are not limited to computing systems, servers, desktops, laptops, tablets, cellular phones, appliances, vehicles, and the like.

Examples of remote nodes described herein may further include one or more sounding processors, such as sounding processor 130. Any kind and/or number of processors may be present in remote node 104, including one or more central processing unit(s) (CPUs); graphics processing units (GPUs); other computer processors, mobile processors, digital signal processors (DSPs), microprocessors, computer chips; and/or other processing units configured to execute instructions. Examples of sounding processors as described herein may be configured to perform one or more sourcing processing and/or receive processing, such as when a remote node, such as remote node 104 of system 100 receive one or more sounding signals and/or sounding sequences and/or sounding sequence signals from a base node (e.g., a sequence of beamformed sounding signals), such as base node 102 of system 100. In some examples, sounding processor 130 may be communicatively coupled to one or more components, such as sounding storage 132 and/or any additional and/or alternative components of remote node 104, whether shown or not shown.

Examples of remote nodes described herein may further include sounding storage, such as sounding storage 132. Sounding storage 132 may generally be and/or include any form of memory and/or storage, such as a SSD, HDD, NVMe drive, and the like, configured to store data and or metadata, such as SINR, RXSI, initial transmit weights, channel metrics, and/or any additional and/or alternative data and/or metadata relevant to determining spatial compatibility metrics and/or determining initial transmit weights and/or performing any other operations relevant to system 100. In some examples, sounding storage 132 may include data and/or metadata received from a user of a base node, such as base node 102. In some examples, sounding storage 132 may include data and/or metadata received from one or more base nodes, such as base node 102 and/or other remote nodes (not shown). In some examples, sounding storage 132 may include data and/or metadata calculated and/or determined at remote node 104. In some examples, sounding storage 132 may include data and/or metadata not used in determining spatial compatibility metrics and/or initial transmit weights. In some examples, sounding storage 132 may be updated to include additional data and/or metadata, such as with additional metrics and/or data and/or metadata received from one or more base nodes, such as base node 102. In some examples, sounding storage 132 may be updated to include additional metrics, such as additional SINR and/or additional RXSI. In some examples, sounding storage 132 may include one or more metrics and/or data and/or information, such as SINR 132, RXSI 136, receive sounding weights 138, and/or initial payload transmit weights 146. Sounding storage 132 may be communicatively coupled to one or more components, such as sounding processor 130.

Operationally, base node 102 may be configured to execute instructions, such as executable instructions for determining spatial compatibility metrics 124; executable instructions for determining initial transmit weights 126; and, executable instructions for selecting time and/or frequency resources based on calculated spatial compatibility metrics 128.

Recall that in some examples, a BN (such as base node 102) does not know where one or more RNs (such as remote node 104) are located within the communication system. As such, to begin the spatial compatibility determination process, base node 102 may be configured to, by executing executable instructions 126, determine one or more initial transmit weights, e.g., for use when transmitting the one or more sounding signal(s) and/or the sounding signal sequence to a plurality of nodes, including in some examples, a first node and a second node. In some examples, the plurality of nodes may include remote node 102. In some examples, the plurality of nodes may include remote node 102 and additional and/or alternative remote nodes. In some examples, remote node 102 may be the first node. In some examples, remote node 102 may be the second node.

In some examples, base node 102 may be configured to select a sequence of transmit weights to be used by the base node 102 during the transmission of the sounding signal(s) to the plurality of nodes including the first node and the second node. In some examples, the selection, by base node 102, of the transmit weights (e.g., initial transmit weights) may results in a signal (e.g., the sounding signal(s)) that reaches all users (e.g., all users of the plurality of nodes; all of the plurality of nodes; the first node and/or the second node; the remote node 102, etc.). At the same time, the received signal quality of the received sounding signal should be like that of payload to avoid sounding being the limiting factor of the system. In some examples, one option is for a BN, such as base node 102, to select random weights and given enough different random weights, all users will be covered. A problem with this approach is that the potential beamforming gain may be low and many weights resulting in a long time before all users have been covered. For most fixed wireless deployments, the BN is mounted elevated on a structure such as a tower. In that case, the BN can form beams in different angular directions and with a set of beams the whole field of view can be covered. This case is very similar to a light house sending a beacon of light in different directions. With this type of beam, most RNs enjoy significant beamforming gain and the duration to scan all RNs is relatively short depending on the beamwidth and the angular region to scan.

Figure 8:
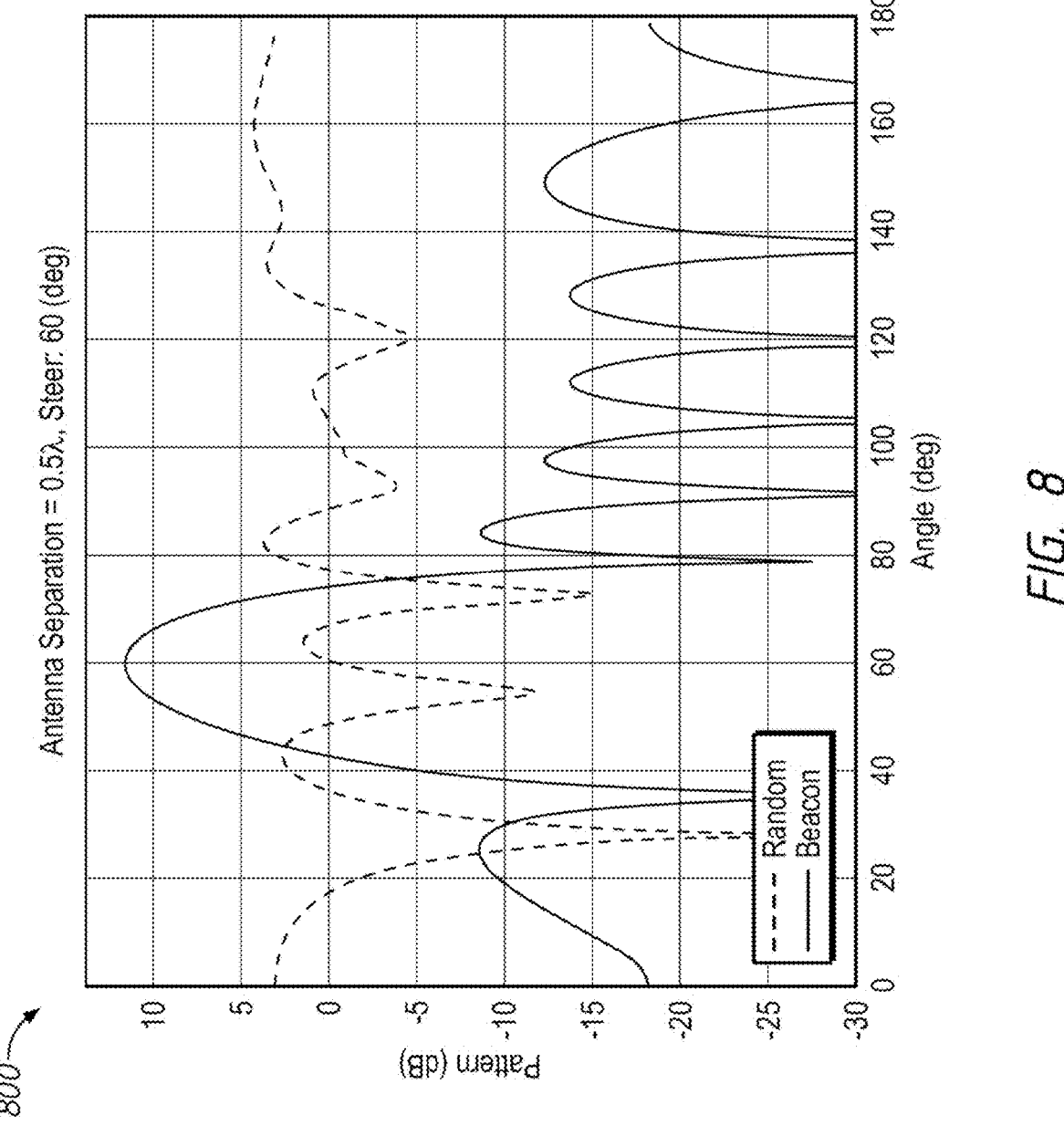
FIG. 8 is a graphical illustration 800 of beam steering for a base node, arranged in accordance with examples described herein.

An example is shown FIG. 8, which is a is a graphical illustration 800 of beam steering for a base node, arranged in accordance with examples described herein. FIG. 8 illustrates for a BN with a uniform linear array 16 transmit antennas and with an element-to-element separation corresponding to half a wavelength. Furthermore, the antenna array consists of a dual-polarized antenna elements where a vertical and polarized antenna is placed in each location. Hence, the 16-element BN antenna only has 8 unique locations. In FIG. 8, the beam (solid line) is steered towards 60 degrees relative to the array axis. With this definition, broadside or perpendicular to the axis of the antennas corresponds to 90 degrees. RNs located within 5-10 degrees of this angle may be covered by this beam. Also shown is an example of a random beam (dashed line) which lacks the beamforming gain since the maximum value is lower than the peak of the beacon beam (solid line).

Figure 9:
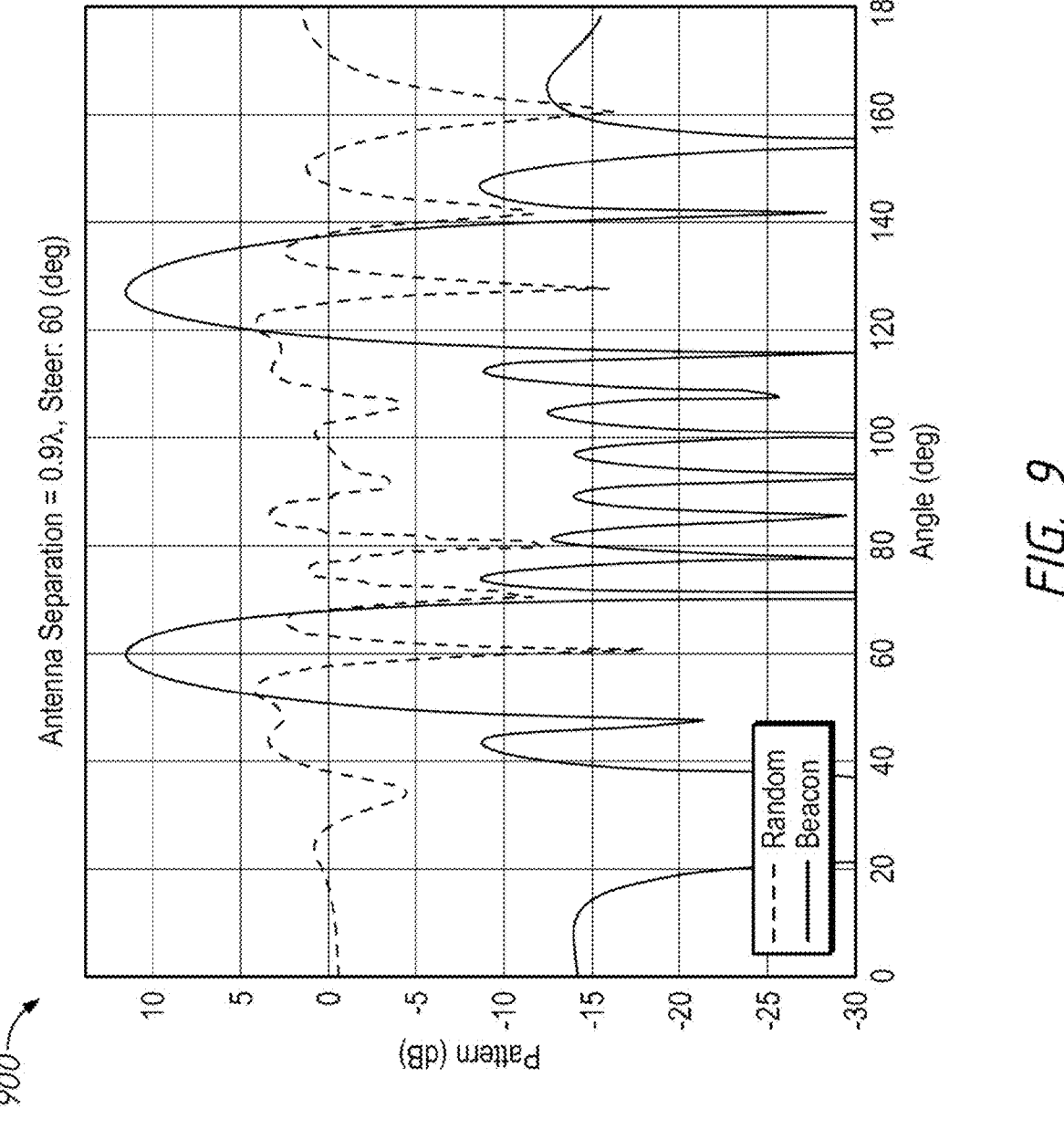
FIG. 9 is a graphical illustration 900 of beam steering for a base node, arranged in accordance with examples described herein.

Another example is shown in FIG. 9, which is a is a graphical illustration 900 of beam steering for a base node, arranged in accordance with examples described herein. In some examples, FIG. 9 illustrates where a beam is steered to 60 degrees for a BN with an array 16 transmit antennas and with an element-to-element separation corresponding to 0.9 wave lengths. However, in addition to the beam at 60 degrees, another beam appears at 128 degrees. In some examples, this is often called a grating lobe and, in some examples, appears because the antenna elements are spaced further apart. There is a duality between sampling in time and in space where the Nyquist theorem states that to measure a time domain signal, the sampling rate must be at least twice the frequency of interest. Similarly, the spatial sampling rate, in some examples, must be denser than 0.5 wavelengths. The element-to-element distance (spatial sampling rate) in FIG. 9 is 0.9>0.5 which, in some examples, caused the grating lobe. The location of the grating lobe can be computed as seen in Equation 1 of FIG. 13A. By inserting $d/\lambda=0.9$ and $\alpha=60/180*pi$ as values into Equation 1 of FIG. 13A, it yields $\alpha g=128$ deg which aligns with FIG. 9.

Figure 10:
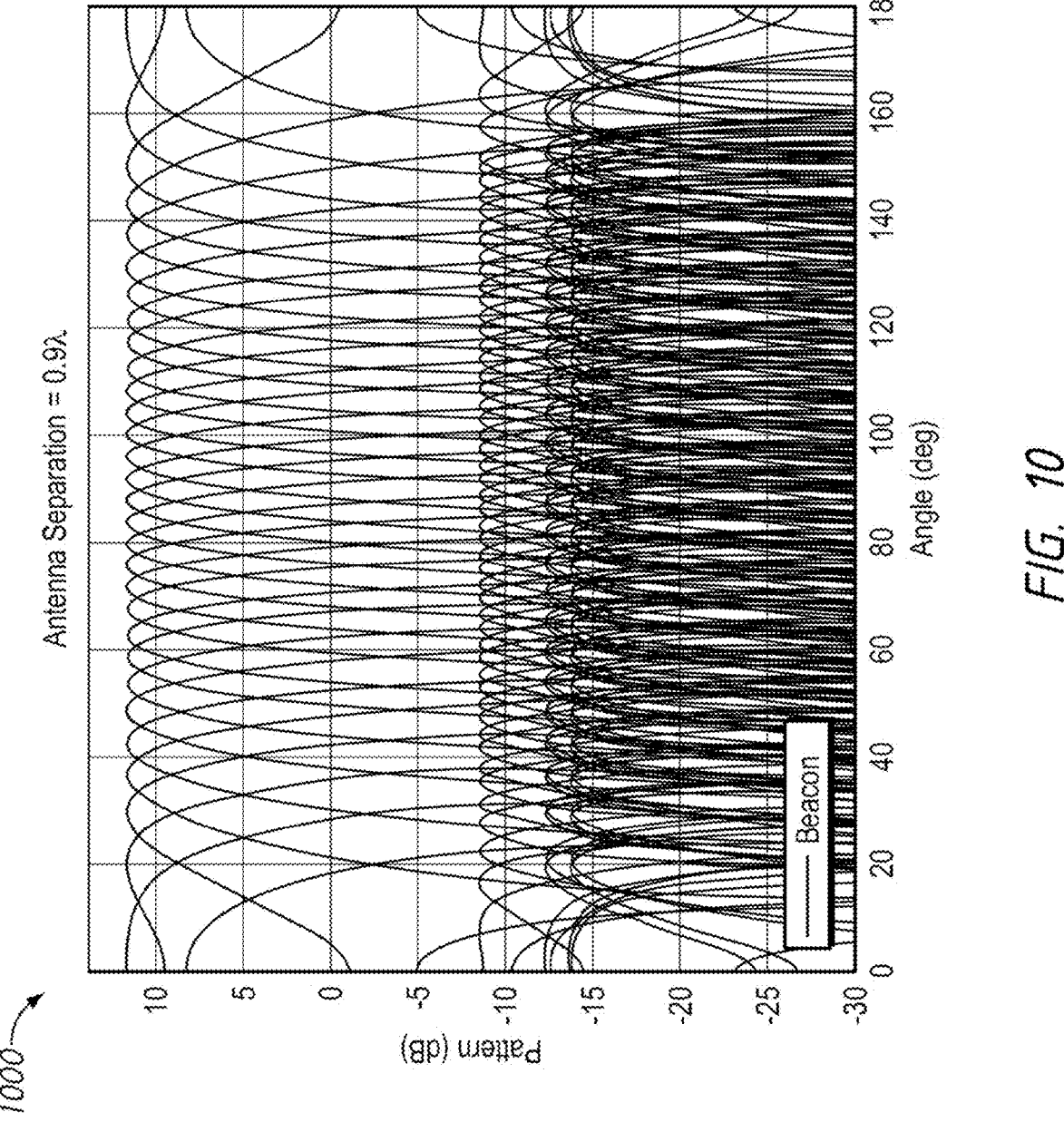
FIG. 10 is a graphical illustration 1000 of beam scanning in a cosine domain(s) for a base node, arranged in accordance with examples described herein.

In some examples, for a base node, such as base node 102 of FIG. 1, to scan a service area or sector covering angles from 30 degrees to 150 degrees, 16 beams spaced (150-30)/16=7.5 degrees apart may be used. However, from the insights of FIG. 9, $acos(cos(30/180*pi)-\lambda/d)/pi*180=104$ degrees need only be scanned. In examples, this scanning results in more closely spaced beams. In some examples, if spacing the beams equidistantly in the angle domain, the spacing becomes (104−30)/16=4.6 degrees. In some examples, spacing the angles equidistantly in the cosine domain instead of the linear domain may yield similar dips between beams as shown in FIG. 10 where 16 beams are used to cover the angles 30 degrees to 150 degrees. In that case, the dips are in between beams are uniform at 0.7 dB across the angular range which is acceptable in terms of covering all RNs.

While the above, in some examples, focuses on the horizontal (azimuth) angles in terms of sweeping beams and coverage, it should be appreciated that similar beams and sweeps may also be conducted in vertical dimension (vertical angle) by using an array of elements spaced in the vertical dimension, and such sweeps are contemplated as being within the scope of this disclosure. In some examples, for an array spaced in a two-dimensional pattern, sweeping in both azimuth and vertical angles may be possible.

In some examples, often the channel propagation depends on the polarization and may result in different transmit weights per polarization. Transmission and receive using one or more polarizations for a single stream is discussed herein. Multi-stream multi-polarization transmissions are also discussed herein.

In some examples, once base node 102 has determined one or more initial transmit payload weights, based on sounding transmit weights, receive signal strength data, and signal to interference data, base node 102 may further perform sounding transmit beamforming and/or receive processing, as described herein. While determining initial transmit payload weight(s) at a base node is discussed herein (among other determinations discussed herein at either/both a base node and/or a remote node), it should be appreciated that in some examples, base node 102 may perform sounding transmit beamforming, to transmit one or more (or a sequence of) beamformed sounding signals without utilizing the determined initial transmit payload weights.

In some examples, base node 102 may be configured to, by executing executable instructions for determining spatial compatibility metrics 124, transmit, from base node 102, sounding signals (e.g., a sequence of beamformed sounding signals; a broadcast signal) to a plurality of nodes including a first node and a second node. In some examples, base node 102 may be configured to transmit sounding signals (e.g., a sequence of beamformed sounding signals) to a remote node, such as remote node 104. In some examples, base node 102 may also be configured to transmit a second signal sequence (e.g., a signal sequence using determined transmit payload weights; payload data signals, etc.) to a remote node, such as remote node 104. In some examples, the sequence of beamformed sounding signals may be broadcast and/beamformed and/or transmitted via DL sounding 140 of FIG. 1.

In some examples, base node 102 may be configured to, by executing executable instructions for determining spatial compatibility metrics 124, receive, responsive to the sounding signal(s) and at base node 102, one or more metrics from one or more remote nodes, such as remote node 104. In some examples, the one or more metrics received from the one or more remote nodes, including from remote node 104 may include, but are not limited to, the receive signal strength data (RXSI) and/or signal-to-interference data (SINR). In some examples, the receive signal strength data (RXSI) may be RXSI 136 of FIG. 1. In some examples, the signal-to-interference data (SINR) may be SINR 134 of FIG. 1.

While an example of sounding transmit beamforming and receive processing is discussed herein, it should be appreciated that other sounding processing options exist, and are contemplated to be within the scope of this disclosure. In some examples, if a 16-antenna element BN use a 16×1 transmit sounding weight vector wtx, the received sounding signal Y at a sub-band or sub-band pair may be modeled as Equation 2 of FIG. 13A, where Y is an 8×N matrix if the RN has 8 antennas, H is an 8×16 channel matrix, and the transmitted signal s is 1×N. In some examples, the transmit sounding weight wtx may be computed to sweep the angular sector similarly to the examples above. The transmitted signal for a sub-band or sub-band pair may be selected such that it is different from BN to BN to enable the RN to differentiate the sounding signals from multiple BNs within the area. The RN may then estimate receive sounding weights that aims at estimating the 1×N transmitted signal set as Equation 3 of FIG. 13A, where the receive sounding weights wrx are 8×1 for an 8-antenna element RN and the superscript H denotes transpose and complex conjugate. There are many different options for determining the receive sounding weights. In some examples, a common type of weight is the weight that maximizes the receive signal-to-noise-ratio (SINR) but many other weights may be used. One example of estimating the receive SINR is to compute the ratio of the expected signal and the error in the estimate, i.e. Equation 4 of FIG. 13A.

Similarly, the received signal strength per antenna can be estimated in many ways. One example is to correlate with the transmitted signal to suppress noise and interference as Equation 5 of FIG. 13A, where nRx denotes the number of receive antennas.

In some examples, a B×1 vector of B estimated SINRest and another B×1 vector containing B estimated signal strengths RXSIest may be generated from a sequence of B sounding beams that cover the service area. These two vectors may contain information about the spatial properties of the channel to the RNs and can be used to formulate a spatial compatibility metric. Furthermore, by combining the RXSIs and SINRs with sounding transmit wtx and sounding receive weights wrx, initial payload transmit weights for both the RN and BN may be formulated. Finally, the payload signal quality in both UL and DL can also be predicted by combining this information with additional parameters such as transmit power and hardware settings of the BN and RN, as discussed herein.

In some examples, base node 102 may be configured to calculate, by executing executable instructions for determining spatial compatibility metrics 124, a compatibility metric for at least two nodes, comprising the first node and the second node. In some examples, one or more of the at least two nodes that base node 102 may be configured to calculate a compatibility metric for may be a remote node, such as remote node 104. In some examples, base node 102 may be configured to calculate the compatibility metric for the at least two nodes based at least on the receive signal strength data and the signal-to-interference data.

In some examples, to calculate the compatibility metric for the at least two nodes, including in some examples, remote node 104, base node 102 may be configured to calculate a first spatial signature metric for the first node, based at least on receive signal strength data for the first node and signal-to-interference data for the first node. Base node 102 may further be configured to calculate a second spatial signature metric for the second node, based at least on receive signal strength data for the second node and signal-to-interference data for the second node. In some examples, base node 102 may be configured to calculate the compatibility metric for the at least two nodes based at least on the calculated first spatial signature metric for the first node and the calculated second spatial signature metric for the second node.

In some examples, base node 102 may be configured to determine that first node and the second node are spatially compatible using the calculated compatibility metric for the at least two nodes. In some examples, base node 102 may determine that the first node and the second node (e.g., at least two nodes) are spatially compatibility with each other based at least on the calculated compatibility metric exceeding a threshold. In some examples, base node 102 may calculate the compatibility metric for the at least two nodes based at least on combining receive signal strength data for the first node (e.g., SINR 134) and signal-to-interference data for the first node (e.g., RXSI 136), and combining receive signal strength data for the second node (not shown) and signal-to-interference data for the second node (not shown). In some examples, combining the receive signal strength data for the first node (e.g., SINR 134) and the signal-to-interference data for the first node (e.g., RXSI 136) may include multiplying the receive signal strength data for the first node (e.g., SINR 134) and the signal-to-interference data for the first node (e.g., RXSI 136). In some examples, combining the receive signal strength data for the second node (not shown) and the signal-to-interference data for the second node (not shown) may include multiplying the receive signal strength data for the second node (not shown) and the signal-to-interference data for the second node (not shown).

In some examples, base node 102 may calculate the compatibility metric for the at least two nodes based at least on calculating a correlation between data received from the first node, including the receive signal strength data for the first node and the signal-to-interference data for the first node, and data received from the second node, including the receive signal strength data for the second node and the signal-to-interference data for the second node. In some examples, receive signal strength data and signal-to-interference data is computed over several portions of a communication bandwidth such as a sub-band or a sub-band pair. In some examples, the receive signal strength data and signal-to-interference data is combined across the communication bandwidth to suppress noise and interference before computing the compatibility metric. In some examples, said combining is performed by sorting and selecting a percentile.

In some examples, a spatial signature for user u may be calculated from receive metrics from the sequence of B sounding beams across one or more polarizations. One example is to collect the SINRs into a B×1 vector for user u and normalize as Equation 6 of FIG. 13A, from which a B×1 spatial signature metric for user u may be computed as Equation 7 of FIG. 13A, where superscript H denotes transpose and complex conjugate. Different metrics result if the logarithmic or linear values of the SINRs are used.

In the following, linear SINR values are used. In some examples, a spatial compatibility metric between user u and v may then be computed as Equation 8 of FIG. 13A, which corresponds to a value between 0 and 1 and may also be translated into an angle as acos(cu,v) where 0 means perfectly correlated and pi/2 is uncorrelated.

Another example of formulating spatial signature metrics is to combine the SINR with RXSI as Equation 9 of FIG. 13A, from which a per user B×1 spatial signature metric may be computed as before as Equation 10 of FIG. 13A.

In some examples, a potential benefit of this method is if the SINR is limited to a specific range, the RXSI provides additional information. For example, the SINR may be limited to 35 dB for all beam indices for an RN located close to the BN while the RXSI may still vary across the beam indices providing a better metric. Similarly, for a very long link, the SINR may be flooring and yielding similar values for all beams while the RXSI is different for each beam.

Figure 11:
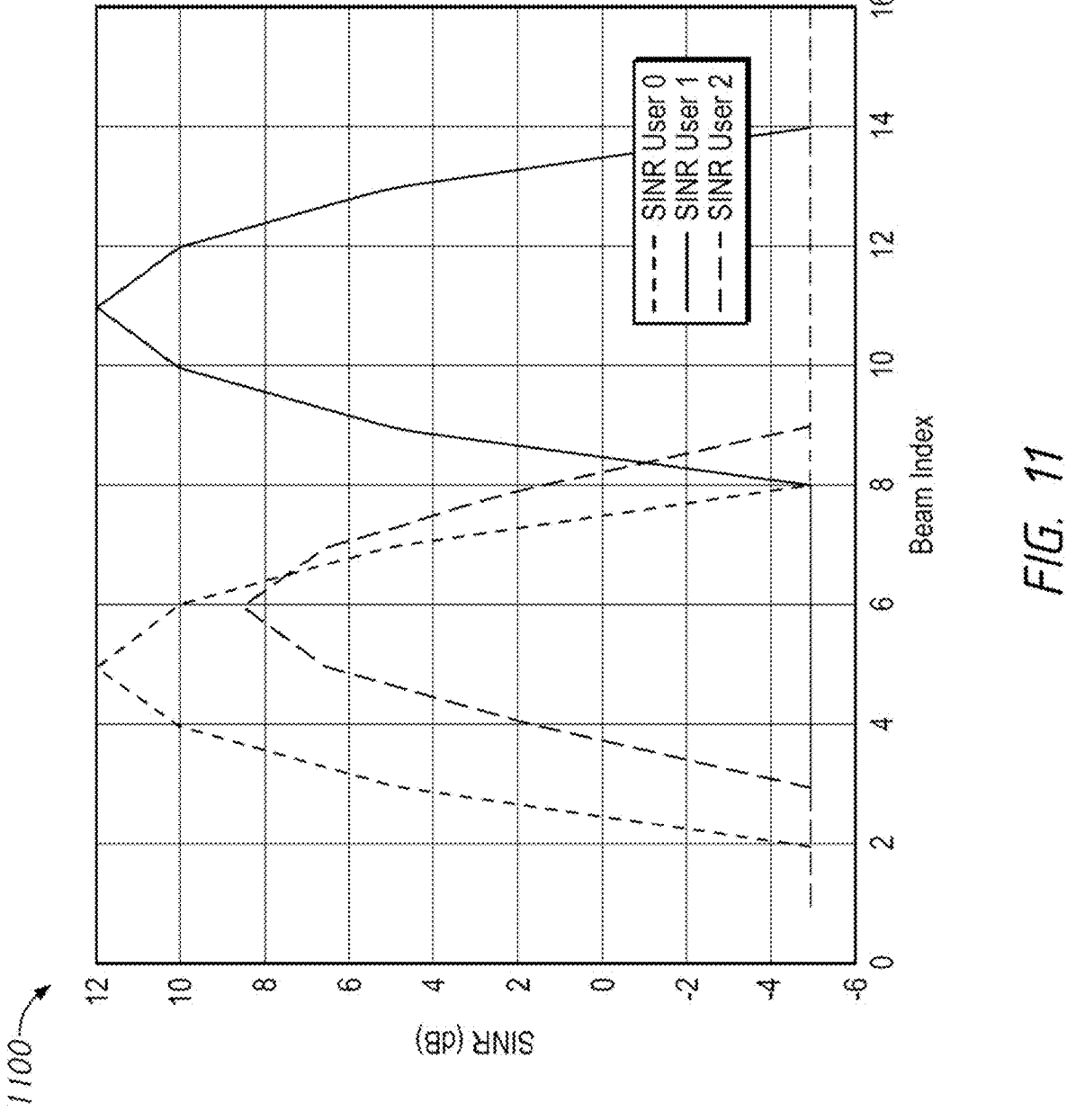
FIG. 11 is a graphical illustration 1100 of SINRs from three users with 16 beams, arranged in accordance with examples described herein.

An example is shown in FIG. 11, which is a graphical illustration 1100 of SINRs from three users with 16 beams, arranged in accordance with examples described herein. In FIG. 11, the SINR from three different users versus different beam indices is shown. In FIG. 11, user 0 has a sequence of SINRs that is closer to user 2 than user 1. Computing the spatial compatibility metric between user 0 and 2 yields c0,2=0.81 while the metric between user 0 and 1 is just c0,1=0.06. Hence, it may be possible to schedule user 0 and user 1 on the same time and frequency resource but not user 0 and 2. In some examples, to determine if two users can be scheduled together, the spatial compatibility metric may be thresholded such as if the threshold is less than a limit, two users may be scheduled together. In some examples, to determine if two users can be scheduled together, the spatial compatibility metric may be thresholded such as if the threshold exceeds a limit, two users may be scheduled together.

In some examples, a simpler approach may be to require a minimum maximum beam index difference between users scheduled on the same sub-band. For example, in FIG. 11, the maximum beam index of user 0 is 5 and for user 2 it is 6 resulting in a maximum beam index difference of one. Setting the threshold to 2 may result in user 0 and 2 not getting scheduled on the same time and frequency resource.

Figure 2:
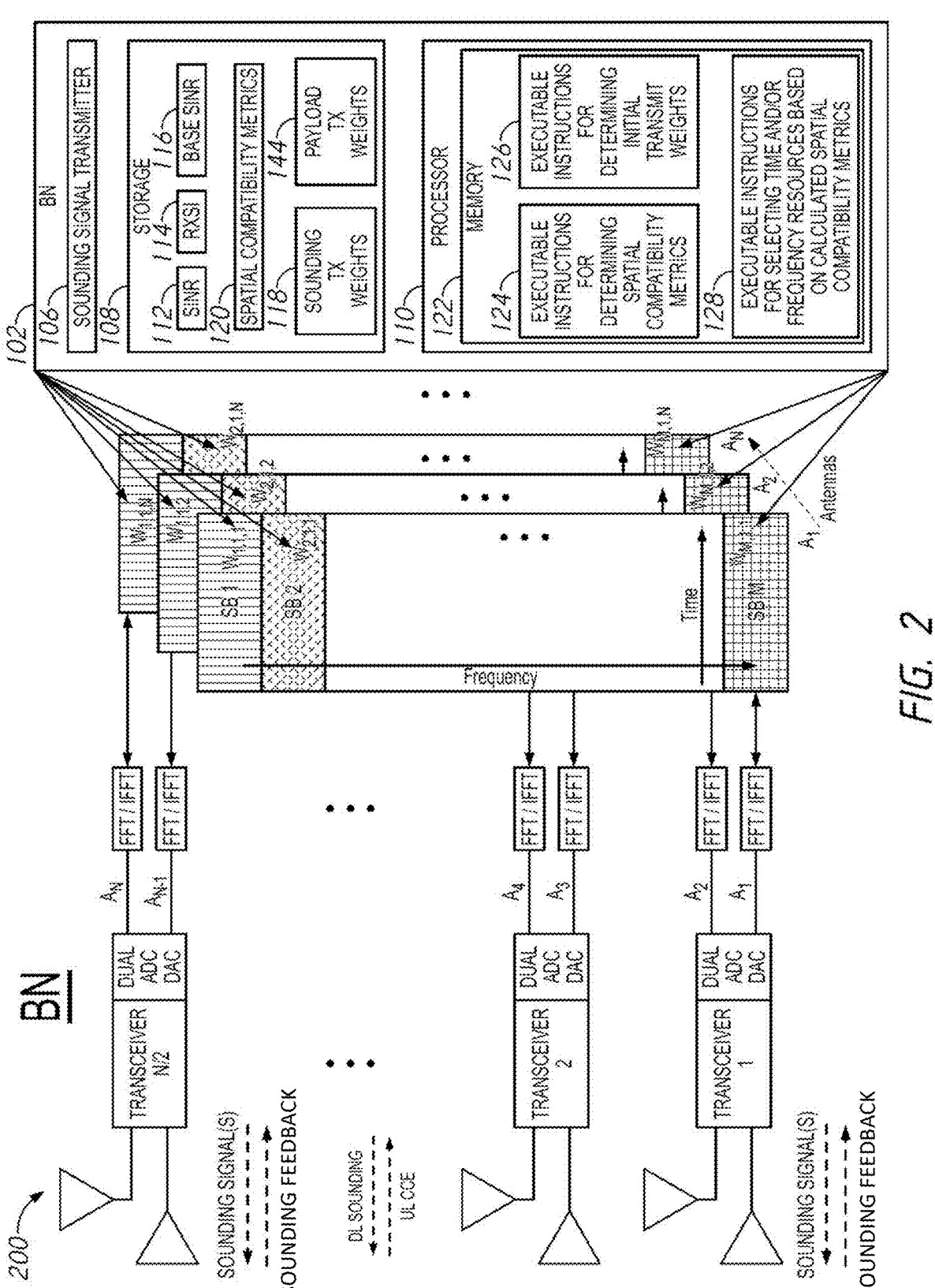
FIG. 2 is a schematic illustration of a base node 200 used in determining spatial compatibility of nodes and weight generation, arranged in accordance with examples described herein.
Figure 3:
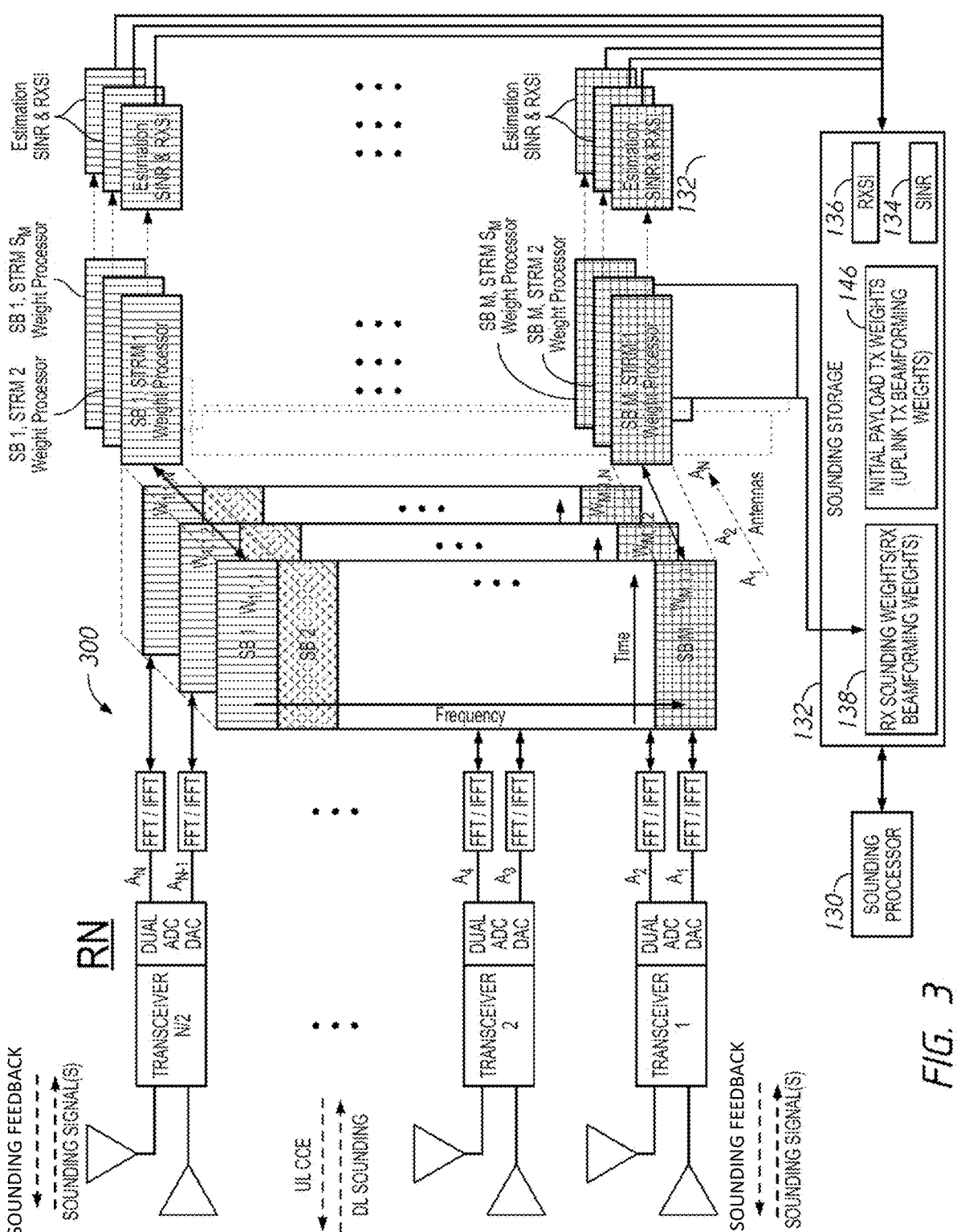
FIG. 3 is a schematic illustration of a remote node 300 used in determining spatial compatibility of nodes and weight generation, arranged in accordance with examples described herein.

In some examples, for an elevated BN with LOS conditions to the RNs, the sequence of SINRs may closely match the angles from the BN to the RNs like the scenario in FIGS. 1-3. However, the same sequence of SINRs may be used in any channel scenario since the it creates a spatial signature per RN. In examples, computing the spatial compatibility metric compares how close the spatial signatures are and may also be applicable for any channel conditions. Hence, thresholding the spatial compatibility metric and thresholding to decide if two users can be allocated together may be applicable to any channel. In some examples, a simpler scheme of basing the decision on the difference in peak beam index may be better suited for LOS channels.

In some examples, once base node 102 has calculated one or more spatial compatibility metrics, base node 102 may use the spatial compatibility metric to select at least two nodes to send one or more data signal to using a same time-frequency resource.

Operationally, base node 102 may be configured to execute instructions, such as executable instructions for selecting time and/or frequency resources based on calculated spatial compatibility metrics 128. In some examples, based on a determination that the compatibility metric for the at least two nodes, including the first node and the second node exceeds a threshold, base node 102 may be configured to select, the at least two nodes comprising the first node and the second node. Base node 102 may further be configured to, in some examples, schedule the selected at least two nodes including first node and the second node to use a same time-frequency resource, based on the compatibility metric. Base node 102, in some examples, may further be configured to transmit, from base node 102 and to the first remote node and the second remote node (e.g., remote node 104), one or more signals using the same time-frequency resource.

Examples described herein include calculating one or more weights, such as payload transmit weights 144, by system 100 of FIG. 1.

In some examples, the sounding processing described above may also be used to compute transmit weights for different systems, not just TDD RDB systems. However, for a TDD RDB systems, typically the sounding computed weights are applied at the time of the initial transmission and following instances uses weights derived from the received weights based on the reciprocity principle. Furthermore, in some examples, the calculation may be different for the UL and the DL depending on the system and sounding signal. Typically, the transmit weight calculation may be performed per sub-band or sub-band pair but may be performed over larger frequency bands as well.

In some examples, the RN, such as remote node 104 of FIG. 1, may compute the UL transmit weights from DL sounding by combining the information gained from the sequence of B beams. A robust scheme for TDD RDB systems is to compute the UL transmit weight from the receive weight associated with the beam with the highest SINR with Equation 11 of FIG. 13A, where o is the index k yielding the largest SINRest,k across the B beams.

In some examples, for a TDD RDB system, this receive weight may be translated into a transmit weight based on calibration as wtx=cal(wrx, best), where the CAL operation ensures that the reciprocity conditions are met This weight selection may work best for Line-Of-Sight (LOS) conditions between the BN and the RN and when there is a clear peak in the sequence of SINRs. For non-LOS channels and channels with much scattering, the sequence of SINRs may not exhibit to a clear peak. In that case, a better weight may be obtained by computing a covariance matrix through weighting (e.g., SINR weighting) of the outer products of the receive weights and then compute the dominant eigenvector of that covariance matrix, e.g., in Equation 12 of FIG. 13A and Equation 13 of FIG. 13A. It should be appreciated that the transmit weight may be calculated based on different receive weights schemes than used to compute SINR and RXSI, such as in Equation 31, Equation 32, and/or Equation 33 for FIG. 13B. For example, a different receive weight scheme may be used yielding a different receive weight when computing the covariance matrix from which the dominant eigenvector is used as transmit weights than the receive weights used to compute the SINR and RXSI.

In some examples, the receive weight may be translated into a transmit weight in the same manner as above based on calibration as wtx=cal (wrx, best). Other weightings of the outer products of the receive weights wrx,k such as combining the RXSI and SINR may also be used. The discussion in this subsection focused on a computing a transmit weight for a single payload spatial stream. This may be extended to multiple payload and sounding spatial streams, as described herein.

In some examples, to compute DL transmit weights from the DL sounding signal, there are no UL receive weights to use for TDD RDB systems. Fortunately, the sounding transmit weights may be used to directly compute DL transmit weights. Like the UL transmit weight computation, a robust scheme may be to select the DL sounding weight that yielded the largest SINR, e.g., via Equation 14 of FIG. 13A, where o is the index k yielding the largest SINRest,k at the RN across the B beams.

In some examples, for channels that does not exhibit a clear SINR peak, a better weight may be obtained by computing a covariance matrix through SINR weighting of the outer products of the BN transmit sounding weights and then compute the dominant eigenvector that covariance matrix, e.g., via Equation 15 of FIG. 13A and Equation 16 of FIG. 13A.

Hence, the computations are like the UL transmit weight computations except that the BN transmit sounding weights are used instead of the received weights and no translation (calibration) from receive weights to transmit weights is required. Since no translation is needed, reciprocity is not required and the scheme is applicable to not only TDD RDB systems. The computation of DL transmit weights may be extended to multiple payload and sounding spatial streams in a similar manner to the UL transmit weights.

In some examples, previous examples considered a DL sounding signal transmitted from the BN to RNs. The example frame structure in FIG. 4 also has an opportunity to send an UL sounding signal where RNs send a sounding signal which the BN receives and processes. If the UL sounding signal is sent in addition to the DL sounding signal, the BN may compute the DL transmit weights for TDD RDB systems using the same scheme as outlined for the RNs UL transmit weights as described herein. Similarly, the RN may calculate UL transmit weights using the scheme outlined for the BN DL transmit weights as described herein.

Examples described herein include signal quality prediction, performed in some examples by system 100 of FIG. 1.

Another key functionality of sounding, in some examples, is the ability to predict the signal quality per sub-band or sub-band pair before allocating payload to a user. For example, knowing the resulting SINR when scheduling a user translates into knowing the throughput achieved. Knowing the achieved throughput enables the allocator/ scheduler to know how many sub-bands or sub-band pairs to allocate to a user to satisfy that users demand. The predicted SINR depends on the payload link direction and if only DL sounding, if only UL sounding, or if both UL and DL sounding is used.

In some examples, the predicted DL SINR when using DL sounding can be calculated directly from the maximum SINR across different beams while compensating for any difference in transmit power between the DL sounding signal and DL payload transmissions, e.g., via Equation 17 of FIG. 13A, where all quantities are in dB. This prediction can be further refined by accounting for changes in the HW settings such as changing receive gain that may impact the receive noise level. There may also be a flooring or ceiling effect of the SINR that may need to be accounted for.

In some examples, for a TDD RDB system, the combined transmit and receive beamformed gains may be the same in the UL and DL. Hence, a similar prediction method can be used to predict the UL SINR as Equation 18 of FIG. 13A, where UL/UL HW terms represent differences in hardware (HW) gain and noise levels in dB. Since the allocator/ scheduler resides at the BN, the BN side parameters are known while the RN side parameters may be fed back using one of the control channels.

In some examples, the predicted SINR may be further refined by considering which users are spatially multiplexed together. In fact, the spatial compatibility metric, in some examples, may be used to offset the above predicted SINRs through a predicted loss if two users are scheduled together. For example, scheduling user u together with user v, may lower user u's predicted SINR as Equation 19 of FIG. 13A. If scheduling more than two users on the same time and frequency resource, the resulting SINR for each user may be lower than if scheduling a single or two users. The expression in Equation 19 may be extended to sum the loss contribution from all users such as in Equation 34 of FIG. 13B. Another method is to compute the loss as the sum of the contribution from the correlation between each pair of per user transmit weights. Yet another method may be to compute the space spanned by all other users and compute the loss from amount the transmit weight change due to the other users such as in Equation 35 of FIG. 13B. This may be partly achieved by formulating a covariance matrix of all users transmit weights.

In some examples, the loss calculation applies to both the UL and DL. The above calculation may be refined to also factor in power differences between users. For example, some users may not achieve the received signal level target and the impact of incompatible co-channel users is larger since the loss is larger due to the power difference.

The pathloss from the transmitter to the receiver is another important system parameter that may be predicted using sounding. In some examples, for DL sounding, recording the DL transmit power and the received signal level RXSI, the pathloss may be estimated by compensating with the transmit beamforming gain.

Examples described herein include wideband processing and interference suppression, performed in some examples, by system 100 of FIG. 1.

In some examples, previous sections considered calculation of SINRs, RXSIs, transmit weights and signal quality predictions separate on separate transmissions and processing per subsets of the full bandwidth such as sub-bands or sub-band pairs. Typically, the sounding signal is sent across the full bandwidth resulting in as many sets of SINRs, RXSIs, transmit weights and signal quality predictions as the computation bandwidths such as sub-bands or sub-band pairs. Transmit weights and signal quality predictions such as SINR may be more useful at the computation bandwidth such as sub-band and sub-band pairs while the spatial compatibility is different. Given that the spatial compatibility is largely determined from the orientation and location of the RN, the compatibility between two users is usually the same across multiple sub-bands or sub-band pairs, i.e. wideband spatial compatibility. How many sub-bands or sub-band pairs the compatibility can be considered the same may depend on factors like but not limited to the environment and on the desired noise and interference suppression. In many cases, several wideband compatibility metrics may be calculated for multiple carriers or larger bandwidths.

Computing a wideband spatial compatibility may be achieved by combining the per sub-band or sub-band pair metrics such as SINRs and RXSI into one spatial signature and one spatial compatibility metric. Using a different beam index at different parts of the band at different times allows for both noise averaging and interference suppression. An example is shown in FIG. 12, which is a graphical illustration of table 1200 of beam index per sub-band pair (SBP) and sounding opportunity (SO), arranged in accordance with examples described herein. In FIG. 12, a different beam index is used per sub-band pair (SBP) and sounding opportunity (SO), e.g., different times, different frames on nomenclature. For each SBP, all different beam indices are used to enable transmit weight and SINR prediction per SBP. However, the beam indices are staggered across SBP where beam index 0 is used for SBP 0 and beam index 1 is used for SBP 1 and so on. If there are more SBPs than beam indices, the index rolls over as illustrated in table 1200 of FIG. 12.

When computing the wideband spatial signature across the bandwidth over which the spatial compatibility is believed to be constant, only one SINR and/or RXSI per beam index may be used. As is clear from Table 1200 of FIG. 12, each beam index is used at many sub-band pairs. Sorting all SINRs and/or RXSIs for each beam index and selecting a percentile may reduce the impact from both noise and interference. For example, if one frame has strong non-cancelable interference resulting in low SINRs and high RXSIs it will not influence the spatial signature. Which percentile to select depends on the system operating point. For example, the desired error probability may be one parameter impacting the percentile selection. Also, the percentile may be selected differently for SINRs and RXSIs. One frame of interference would lower the SINRs while possibly increasing the RXSI. Based on that, one example of percentile selection may be 60% for SINRs and 40% for RXSIs to reduce the impact of the interference frame.

Examples described herein include full channel estimation with beamformed sounding, performed in some examples, by system 100 of FIG. 1.

In some examples, an example of two closely spaced RNs is shown in FIG. 7 where nulls in the beams are formed to improve performance. In that figure, a beam towards an RN is wide while the nulls are narrow. In many cases, the required accuracy of the channel information may be higher for forming nulls than just forming a beam to a user. Hence, for systems using spatial multiplexing the accuracy requirements at the BN may be high to ensure high performance. One way of mitigating this is to use the spatial compatibility metric to avoid scheduling users that are close and thus alleviate the accuracy requirement. However, in many networks, large improvements are possible if accurate nulls can be placed. Just using the SINR weighted DL transmit weights as outlined herein may not yield the required accuracy to form nulls between users.

In some examples, one way of obtaining knowledge of the full channel matrix from each transmit antenna to each receive antenna is to transmit from one antenna at a time and receiving with all antennas recording the channel coefficient from each transmit antenna to each receive antenna. This yields the full channel matrix but without transmit and receive beamforming gains. This may lead to noisy channel estimates for high pathloss RNs that may be located far away from the BN. It also gives up on the interference cancellation provided by receive beamforming as outlined herein.

Another method of obtaining the full channel matrix while still obtaining some of the beamforming gains is to combine the received signal across all the B different transmission instants. The beacon weights sweeping a sector such as 120 degrees span the full space allowing the receiver to learn the full matrix assuming that the channel is stationary which is a reasonable assumption for fixed wireless but less so for mobile wireless. Returning to the expression of the received signal in a sub-band or sub-band pair b at the RN when the BN transmits the DL sounding signal at one sounding opportunity, e.g., Equation 20 of FIG. 13A, where Yb is an 8×N matrix if the RN has 8 antennas, H is an 8×16 channel matrix, and the transmitted signal sb is 1×N.

In some examples, combining the received signal across all B beams into a matrix Y yields Equation 21 of FIG. 13B, where X is a 16×BN matrix. Both the receiver and transmitter know the transmit weights and signal sequences. Thus, the channel can be estimated directly using the pseudo inverse of X as Equation 22 of FIG. 13B, where pinv(X), which is the pseudo-inverse of the matrix X, is a BN×16 matrix that may be large but it can be computed offline since it is known beforehand.

In some examples, the implementation can also be done in stages to avoid storing the full matrices. This scheme has the benefit of extracting the transmit beamforming gain as well as some noise suppression especially when B>>number of antennas. The scheme may be generalized by assuming that several sub-bands or sub-band pairs are similar and estimate one channel matrix. For example, assuming four sub-bands or sub-band pairs are similar, only B/4 sounding opportunities in time is required. For B=16, that results in only four opportunities.

This scheme outlined in previous paragraph does not actively cancel interference but may be extended. One example of extension is to detect interference and exclude that sounding opportunity. Detecting interference may be implemented by comparing the receive SINR versus the expected SINR and/or the RXSI. A more advanced method is to pre-whiten the received signal by first estimating the noise covariance and then estimating the channel as Equation 23 of FIG. 13B and Equation 24 of FIG. 13B.

In some examples, this method may improve performance in interference at the cost of increased computations. Note that both Psperp and pinv(X) can be pre-computed while the 8×8 matrix inverse for an 8 antenna RN requires calculation for each channel estimate.

Examples described herein include sounding signaling, performed in some examples, by system 100 of FIG. 1.

Several types of signaling may be required, in some examples, to implement the scheme described herein. Several important types include (1) transmission of the sounding signal itself covering the full or partial band of payload; (2) the received sequence of metrics such as SINRs and RXSIs and other parameters such as receive gain and noise levels; and, (3) full channel matrix feedback.

Figure 4:
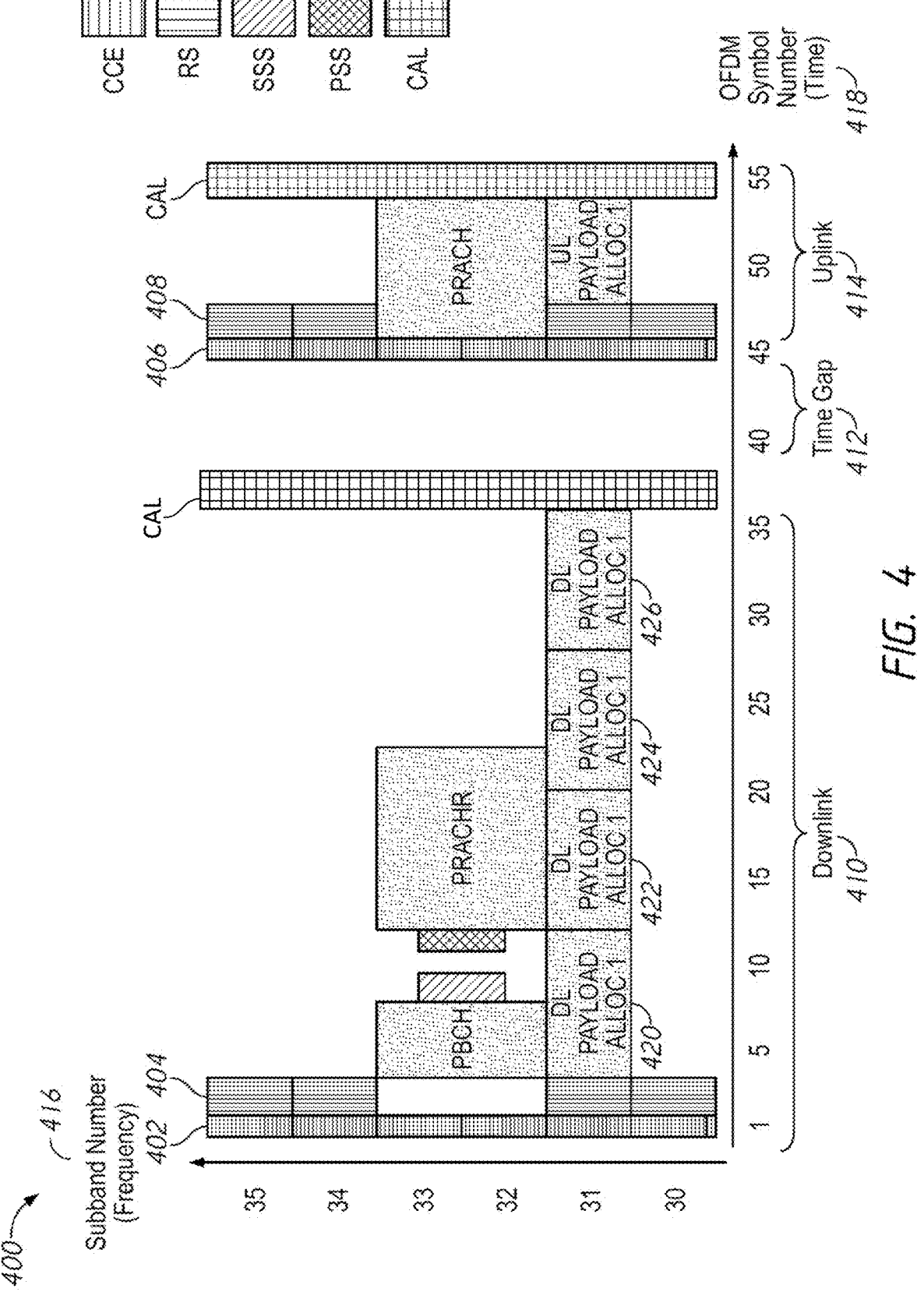
FIG. 4 is a schematic illustration of an example time-division-duplex (TDD) orthogonal frequency-division multiple access (OFDMA) radio frame-structure 400, arranged in accordance with examples described herein.

In some examples, and with respect to transmission of the sounding signal itself covering the full or partial band of payload, in the example signal and the frame structure in FIG. 4, the sounding signal is sent on some frames using the calibration symbol that is the last part of a sub-frame. Both DL and UL calibration symbols are defined enabling both DL and UL sounding. The sounding sequences are selected such that they are orthogonal between neighboring BNs.

In some examples, and with respect to the received sequence of metrics such as SINRs and RXSIs and other parameters such as receive gain and noise levels, for the example of DL sounding, the SINRs and RXSIs are computed per sub-band or sub-band pair at the RN but mostly the scheduler and allocator reside at the BN. Hence, those metrics may be fed back from the RN to the BN. In the example signal and the frame structure in FIG. 4, this feedback is sent using the per user UL CCE channel over a sequence of frames. Note that feeding back information for the full band may be a large amount of information making it prohibitive for mobile systems but feasible for fixed-wireless where channels are expected to be slowly varying. To minimize the feedback amount and the latency, the SINRs and RXSIs are quantized before feeding back. Alternatively, the feedback may be sent using the payload channel.

In some examples, and with respect to the full channel matrix feedback, when using the full channel estimation outlined herein one option is to feed back the full 8×16 channel matrix H for each sub-band or sub-band pair using the UL CCE channel in the example system in FIG. 4. Another option that reduces the amount of information to feed back is to compute and feeding back only the eigenvectors or singular vectors corresponding to the largest eigenvalues. For both options, it is a substantial amount of information to feed back that may make it prohibitive for mobile systems but feasible for fixed wireless. Access to the full channel information at the BN when forming transmit weights may substantially improve the accuracy of nulls towards other users and or interference.

Examples described herein include network sounding, including interference mitigation, sector edge detection, and grating lobe detection, performed in some examples, by system 100 of FIG. 1.

In some examples, an RN that is in the vicinity of two or more BNs may receive the DL sounding signal from several BNs creating interference and reducing performance if one or more BNs use the same frequency. The case when all neighboring BNs use the same frequency is often called universal frequency reuse. While some examples described herein focus on BNs with universal frequency reuse but is also applicable under other frequency selections. The scheme outlined herein may only provide limited gains if the BNs use the same sequence of beam indices for each cycle of B sounding opportunities. If two or more BNs beamform to the RN at the same sounding opportunity the results may be poor and repeat every sounding cycle. One way of avoiding this is for each BN to select a different sequence of beam indices for each sounding cycle. That way, if there is a collision on one cycle it may not repeat the next cycle. This may dramatically improve performance when combined with cross sounding cycle processing. For example, the transmit weights and predicted SINRs may be selected from several sounding cycles based on a criterion. Criteria may be excluding the worst ones, averaging, or using a percentile across cycles. The sequence selection per BN may be based on unique BN identifiers such as serial numbers or other identifiers.

In some examples, an RN that is in the vicinity of two or more BNs may receive the DL sounding signal from several BNs. If the BNs use different sounding sequences, the RN may detect the SINR and RXSI to multiple BNs. This may be used to define sector edge RNs as RNs with SINRs and or RXSI from more than one BN exceeding a threshold. The RN can then feed back which BNs it can hear enabling cross sector interference mitigation. Another method may be to feed back the full sequences for multiple BNs which combined with location information may be used to define a sector edge geographical area. For networks with inter BN communication, the allocator may then avoid allocating two sector edge RNs at the same time frequency resource. For networks without inter BN communication, other schemes such as rules dividing the time and frequency resources may be used. Alternatively, all the RNs within the sector may be associated with the same BN which may avoid allocating those RNs on the same time and frequency resource.

In some examples, if the antenna element separation exceeds half a wavelength, it may create grating lobes. An example is shown in FIG. 9. The existence of grating lobes may result in a larger number of RNs being considered sector edge if the grating lobe lands in an adjacent sector. Having RNs listen to the BNs sounding sequences of multiple BNs and feed that back to the BNs where inter-BN communication exists may enable detection of grating lobes landing in adjacent sectors. It may also impact the spatial compatibility even when the geographical location of two RNs appears far apart. The spatial compatibility metric may factor in possible grating lobes. Detecting grating lobes may be useful for network planning and sector edge solutions. One way of detecting grating lobes is to use the sequence of SINRs and beam directions combined with the geographical location of the RN that may be available through GPS or installer entered information.

Examples described herein include full multiple streams and/or multiple polarization transmissions, performed in some examples, by system 100 of FIG. 1.

In some examples, if only considering a single stream for both payload and the DL sounding signal, using all antennas provides the most transmit power and transmit beamforming gain. If using dual-polarized antennas, it may make sense to sweep both polarizations with the same angle at the same time. The receive weights may then contain both polarizations and the receive SINR combines both polarizations based on the optimality criterion of the receive weights. If SINR maximizing weights are used, then the receive weights combines the two polarizations to yield the maximum SINR. Those weights are then used in the transmit weight calculation and signal quality prediction for that single stream. Sweeping one polarization at a time may be preferred in some cases where better estimates of the cross polarization may be computed when only transmitting from one polarization at a time.

In some examples, another factor in designing multi-polarization transmissions is the antenna arrangements. If both the RNs and the BNs antennas are vertically and horizontally polarized, one sounding scheme may be preferred. On the other hand, if one side or both use antenna elements that combine both vertical and horizontal polarizations such as orienting the antennas at a 45-degree angle, other schemes may be preferred. For example, for horizontally and vertically oriented antennas, the difference in propagation characteristics between polarizations may be exploited when transmitting more than one stream on the same time and frequency resource. A common choice is to separate the two streams by sending one stream on one polarization and the other stream on the second polarization. In that case, the transmit weight calculation estimation example may be used twice, one for each polarization. Similarly, the signal prediction may be repeated once per polarization.

Some channels exhibit significant cross polarization, i.e. when transmitting on one polarization, a significant of energy is also received on the other polarization. For those channels, transmitting on each polarization separately may limit beamforming gains and possible transmitter power gains. Similarly, for antennas combining both vertical and horizontal polarizations using only half the antennas may limit performance. DL sounding for those channels may be done in several ways. One example is to send two spatial streams with separate sounding sequences using an orthogonal combination of the two polarizations and sweep the angles in the same manner as described herein. Another option is to send one stream (separated in polarization or through an orthogonal combination) at a time and sweep the angles.

In both cases, one set of SINRs and RXSIs as well as the covariance matrix constructed through a weighted (e.g., SINR weighted) outer product of receive vectors as described herein is obtained per stream. Different schemes may be used to combine these two sets to find transmit weights, spatial metric, and signal predictions. One method is to simply add the covariance matrix from each stream, e.g., Equation 25 of FIG. 13B, where Rrn,s1 is the weighted outer products of the receive weights for the first sounding stream and Rrn,s2 for the second sounding stream. Note that this may be extended to more streams by summing the contributions from all streams. The UL transmit weight for a single stream may be found as the dominant eigenvector as Equation 26 of FIG. 13B.

The UL transmit weight for a possible second stream may then be obtained as the eigenvector corresponding to the second largest eigenvalue of R. Similarly, the SINRs and RXSIs used in the spatial compatibility computation herein may be replaced as the sum of the SINR across the two streams and similar for RXSI. Note that the interference and noise suppression described herein may still be applicable but replaced with the sums. The computation of DL transmit weights may be extended in a similar manner to multiple sounding and payload streams.

In some examples, to predict the signal quality, the methods described herein may still be used by replacing the SINR with a combination of the two stream SINRs. The single stream (first stream) SINR to use for prediction may be computed as Equation 27 of FIG. 13B.

If transmitting two payload streams, the corresponding SINRs may be predicted using the same method where the predicted SINR for one stream is the same as the single (first) SINR and the second stream SINR as Equation 28 of FIG. 13B.

The scalings C1 and C2 may be computed in different ways. One example is to scale based on the first two eigenvalues λ1 and λ2 of the combined covariance matrix R as Equation 29 of FIG. 13B and Equation 30 of FIG. 13B.

Other similar methods may be based on the correlation ρ of the dominant eigenvectors v1 and v2 of Rrn,s1 and Rrn,s2 as ρ=v1Hv2.

Examples described herein include control channel allocation, performed in some examples, by system 100 of FIG. 1.

In some examples, the sequence of SINRs and RXSIs provides the spatial signature which is used to select which RNs to spatially multiplex for payload. Typically, allocation decisions are made at the BN and the spatial signature is estimated at the RN and fed back in the UL CCE channel. That information is not available when making the initial UL CCE allocation when an RN enters the network. For the example system in FIGS. 6 and 7, RNs enter the network by first sending an UL PRACH signal. If the BN correctly receives that, it sends a DL PRACH response (PRACHR). If the RN correctly receives that, it sends an UL PUCRCH message. Upon successfully receiving the UL PUCRCH message, the BN sends a DL PDCRCH containing an initial control channel (CCE) allocation. Without knowledge of the channel to the RN, the BN may allocate two RNs on the same sub-band that are not spatially compatible resulting in poor CCE performance. Including compressed spatial signature information such as the beam index corresponding to the maximum SINR and/or RXSI in the UL PUCRCH enables the BN to avoid spatially incompatible RNs for the initial CCE allocation.

Examples described herein include network optimization, performed in some examples, by system 100 of FIG. 1.

For elevated BNs serving LOS RNs, the maximum beam index may correspond to the angular direction to the RN.

Combined with the propagation time, it may provide an estimate of the RNs location enabling low-cost RNs without GPS. For some RNs, the installer may enter the location of the RN and the location estimate can be used to detect incorrect entries. Similarly, for RNs equipped with GPS, the location estimate can be used to detect GPS malfunctions as well as calibrating the location estimate using the GPS information.

The width of the SINR peak may also be used to provide information about the scattering and used to classify channels. For example, it may be used to define LOS vs near-LOS channels. This classification may then be used to derive system configuration parameters.

In this way, examples described herein facilitate and/or enable determining which nodes (e.g., remote nodes) within a wireless communications system are spatially compatible with each other in order to schedule data signals to the nodes using the same time-frequency resource. Examples described herein facilitate and/or enable the determination of initial transmit weights used by a base node when sending signals (e.g., sounding signals, data signals, a sequence of beamformed sounding signals) to one or more remote nodes of the communications system.

FIG. 2 is a schematic illustration of a base node 200 used in determining spatial compatibility of nodes and weight generation, arranged in accordance with examples described herein. Base node 200 may include elements and/or processes that have been previously described with respect to the system 100 of FIG. 1 for determining spatial compatibility of nodes and weight generation. Those elements that have been identified in FIG. 2 using the same reference numbers used in FIG. 1, and operation of the common elements, is as previously described. Consequently, a detailed description of the operation of these particular elements will not be repeated in the interest of brevity.

Base node 200 of FIG. 2 includes multiple transceivers where each transceiver is depicted with two antennas. It should be appreciated that while each transceiver of base node 200 is depicted as having two antennas, that each transceiver of base node 200 may include any number of antennas, including one or more antennas, and/or other combination of antennas. In some examples, one or more transceivers of base node 200 of FIG. 2 may have three or more antennas.

The transceivers of base node 200 are each coupled to an FFT/IFFT transform block. The signals at the right-hand side of the transform blocks are depicted by sets. One set (shown as signals arranged in frequency over time) is depicted for each antenna, and within each set are multiple sub-bands of frequencies. There is one set for each antenna. The transform blocks are coupled to weight processors. Signals at the right-hand side of the weight processors are depicted as streams. Each stream may include a weighted combination of the per-antenna sets of signals. Note that transmission is from the right side of the figure towards the left where the data to send in each stream is transformed into per antenna signal to send through the weight processor and following steps. Correspondingly, receiving starts at the antennas and towards the right side of figure where the weight processor converts the per antenna signals into per stream signals that feed the following steps.

In some examples, adaptive coding and modulation (ACM) circuitry (not shown) is coupled to the modulator/demodulators and/or encoder/decoders to provide a modulation and coding scheme (MCS) selection for use by those components. ACM circuitry may include selection circuitry for each sub-band and/or each stream. The modulator/ demodulators and/or encoders/decoders may be coupled to a packet processor (not shown). The packet processor may be coupled to a switch (not shown) for receipt of and/or provision of Ethernet or other data. A scheduler/allocator (not shown) may be coupled to the packet processor and the ACM circuitry. A demand estimator (not shown) may be coupled to the switch and the scheduler/allocator. A spatial database (not shown) may be coupled to the scheduler/allocator and the ACM circuitry. ACM circuitry may include and/or be in communication with stored metrics such as look up table (LUT), hysteresis, and/or margin (not shown).

In some examples, channel sounding is one source of information within a spatial data base (e.g., storage 108) when determining which user to schedule at each sub-band or sub-band pair. It is also used to decide, in some examples, which modulation to select and how many resources, such as sub-bands or sub-band pairs, to schedule to meet the user demand. The user demand in turn may be estimated based on packets in the switch. Sounding may also be used at least partially when computing the transmit weights within the weight processor.

Base node 200 of FIG. 2 may be configured to perform one or more (or all) of the operations performed by base node 102 of FIG. 1. For example, base node 200 of FIG. 2 may be configured to transmit one or more sounding signals (e.g., a sequence of beamformed sounding signals) and/or a sounding sequence to a remote node, such as remote node 104 of FIG. 1 and/or remote node 300 of FIG. 3. In response, base node 200 of FIG. 2 may be configured to receive SINR data and/or RXSI data from remote node 104 of FIG. 1 and/or remote node 300 of FIG. 3. In some examples, the base node, such as base node 102 and/or base node 200 may utilize the SINR data and/or the RXSI data to determine whether remote node 300 and another node, such as another node in system 100 (not shown) are spatially compatible. In some examples, if base node 102 and/or base node 200 determine that remote node 300 and another node, such as another node in system 100 (not shown) are spatially compatible, base node 102 and/or base node 200 may schedule remote node 300 and the another node together at the same time, select a same time-frequency resource for remote node 300 and the another node, and transmit one or more data signals to the remote node 300 and the another node using the same time-frequency resource.

In some examples, base node 200 of FIG. 2 may be configured to calculate initial transmit weights. In some examples, base node 200 may be configured to calculate the initial transmit weights without determining and/or without reliance on a compatibility metric.

FIG. 3 is a schematic illustration of a remote node 300 used in determining spatial compatibility of nodes and weight generation, arranged in accordance with examples described herein. Remote node 300 may include elements and/or processes that have been previously described with respect to the system 100 of FIG. 1 for determining spatial compatibility of nodes and weight generation. Those elements that have been identified in FIG. 3 using the same reference numbers used in FIG. 1, and operation of the common elements, is as previously described. Consequently, a detailed description of the operation of these particular elements will not be repeated in the interest of brevity.

Remote node 300 of FIG. 3 includes multiple transceivers where each transceiver is depicted with two antennas. It should be appreciated that while each transceiver of remote node 300 is depicted as having two antennas, each transceiver of remote node 300 may any number of antennas, including one or more antennas, and/or other combination of antennas. In some examples, one or more transceivers of remote node 300 of FIG. 3 may have three or more antennas.

Remote node 300 and base node 200 may be part of a multi-antenna system, otherwise referred to as a multiple-input multiple output (MIMO) system. In this manner, any number of antennas may be provided in systems described herein, such as 1, 2, 3, 4, 5, 6, 7, 8, 9, 10, 12, 16, 32, 64, 128, 256, or other number of antennas.

The transceivers of remote node 300 are each coupled to an FFT/IFFT transform block. The signals at the right-hand side of the transform blocks are depicted by sets. One set (shown as signals arranged in frequency over time) is depicted for each antenna, and within each set are multiple sub-bands of frequencies. There is one set for each antenna. The transform blocks are coupled to weight processors. Signals at the right-hand side of the weight processors are depicted as streams. Each stream may include a weighted combination of the per-antenna sets of signals. Note that transmission is from the right side of the figure towards the left where the data to send in each stream is transformed into per antenna signal to send through the weight processor and following steps. Correspondingly, receiving starts at the antennas and towards the right side of figure where the weight processor converts the per antenna signals into per stream signals that feed the following steps.

In some examples, the weight processors are coupled to modulation/demodulation encode/decoders (not shown). The modulation/demodulation encoder/decoders may modulate, demodulate, encode, and/or decode the streams in accordance with modulation coding scheme selections. Generally, a modulator/demodulator and/or encoder/decoder may be provided for each sub-band of each stream.

In some examples, channel sounding is one source of information within a spatial data base (e.g., sounding storage 132) when determining which user to schedule at each sub-band or sub-band pair. It is also used to decide, in some examples, which modulation to select and how many resources, such as sub-bands or sub-band pairs, to schedule to meet the user demand. The user demand in turn may be estimated based on packets in the switch. Sounding may also be used at least partially when computing the transmit weights within the weight processor.

Remote node 300 of FIG. 3 may be configured to perform one or more (or all) of the operations performed by remote node 104 of FIG. 1. For example, remote node 300 of FIG. 3 may be configured to receive one or more sounding signals (e.g., a sequence of beamformed sounding signals) and/or a sounding sequence from a base node, such as base node 102 of FIG. 1 and/or base node 200 of FIG. 2. In response, remote node 300 of FIG. 3 may be configured to transmit SINR data and/or RXSI data back to the base node. In some examples, the base node, such as base node 102 and/or base node 200 may utilize the SINR data and/or the RXSI data to determine whether remote node 300 and another node, such as another node in system 100 (not shown) are spatially compatible. In some examples, if base node 102 and/or base node 200 determine that remote node 300 and another node, such as another node in system 100 (not shown) are spatially compatible, base node 102 and/or base node 200 may schedule remote node 300 and the another node together, select a same time-frequency resource for remote node 300 and the another node, and transmit one or more data signals to the remote node 300 and the another node using the same time-frequency resource.

FIG. 4 is a is a schematic illustration of an example time-division-duplex (TDD) orthogonal frequency-division multiple access (OFDMA) radio frame-structure 400, arranged in accordance with examples described herein.

The vertical-axis 416 represents frequency, while the horizontal-axis 418 represents time. The frequency domain (e.g., vertical-axis) is divided into a number of sub-bands, with sub-bands 30-35 being shown in FIG. 4. Any number of sub-bands may be used where each sub-band contains a specified number of subcarriers, not shown, corresponding to the bins of an OFDM Fast Fourier Transform (FFT) residing within that sub-band. The time domain (e.g., horizontal-axis) is divided into FFT blocks, referred to herein as OFDM symbols. Fifty-five (55) OFDM symbols are shown in FIG. 4, although any number may be used within the same or a different amount of time by resizing the FFT as needed.

An example of a TDD orthogonal frequency-division multiple access (OFDMA) frame-structure in FIG. 4, where a base station (BS) or base node (BN) is transmitting to a user equipment (UE) or residential node (RN) during the first part of the frame (symbols 0-40). This part is often called the down-link (DL) part of the frame, such as down-line 410. After a time gap, e.g., time gap 412, the RN is transmitting to the BS or BN for the remainder of the frame. That part is often called the up-link (UL) portion of the frame, e.g., uplink 414, and covers symbols 44-55 in FIG. 4.

User allocations are scheduled in units of a sub-band or sub-band pair that spans several OFDM subcarriers. In the example implementation of FIG. 4, an OFDM FFT size of 4096 subcarriers over a 40 MHz carrier covers 66 sub-bands with 52 subcarriers in each sub-band. In some examples, for other bandwidths, the number of sub-bands may be different. In some examples, for TDD RDB systems, UL and DL allocations may span the same sub-bands to exploit channel reciprocity. In the example shown in FIG. 4, a user is allocated sub-band 31 resulting in 36 data OFDM symbols over 52 subcarriers in the DL and 8 data symbols over the same subcarriers in the UL. The remaining channels are reference symbols (RS), control channels (CCE), broadcast channels (PBCH), and network entry channels (PSS, SSS, PRACH, PRACHR). In some examples, for some frames, the PRACH and PRACHR channels are replaced by the PUCRCH and PDCRCH channels respectively. The reference symbols may be used to compute the receive payload beamformers. In addition, and in some examples, the last DL symbol may be used for both calibration and DL channel sounding. The last UL symbol may be used for calibration and UL sounding.

FIG. 5A is a flow diagram of a method 500 for determining a spatial compatibility metric for at least two nodes and transmitting to the at least two nodes using a same time-frequency resource, arranged in accordance with examples described herein.

The method 500 includes transmitting, from a base node, sounding signals (e.g., a sequence of beamformed sounding signals) to a plurality of nodes in block 502; receiving, at the base node receive signal strength data and signal-to-interference data for each node of the plurality of nodes, responsive to the sounding signals in block 504; and, calculating, at the base node, a compatibility metric for a pair of nodes, including a first node and a second node, of the plurality of nodes, based at least on the receive signal strength data and the signal-to-interference data in block 506.

Block 502 recites transmitting, from a base node, sounding signals (e.g., a sequence of beamformed sounding signals) to a plurality of nodes.

Block 504 recites receiving, at the base node receive signal strength data and signal-to-interference data for each node of the plurality of nodes, responsive to the sequence of beamformed sounding signals.

Block 506 recites calculating, at the base node, a compatibility metric for a at least two, including a first node and a second node, of the plurality of nodes, based at least on the receive signal strength data and the signal-to-interference data.

In some examples, a base node, such as base node 200 of FIG. 2 and/or base node 102 of FIG. 1 may be configured to transmit one or more sounding signals and/or a sounding sequence to a remote node, such as remote node 104 of FIG. 1 and/or remote node 300 of FIG. 3. In response, base node 200 of FIG. 2 and/or base node 102 of FIG. 1 may be configured to receive SINR data and/or RXSI data from remote node 104 of FIG. 1 and/or remote node 300 of FIG. 3.

In some examples, each node in the communication system that received one or more sounding signals may respond by transmitting respective SINR data and/or RXSI data to the base node. In some examples, the base node, such as base node 102 and/or base node 200 may utilize the SINR data and/or the RXSI data to determine whether a remote node and another node, e.g., at least two nodes, are spatially compatible.

In some examples, if a base node 102 and/or base node 200 determine that remote node 300 and another node, such as another node in system 100 (not shown) are spatially compatible, base node 102 and/or base node 200 may schedule remote node 300 and the another node together at the same time, select a same time-frequency resource for remote node 300 and the another node, and transmit one or more data signals to the remote node 300 and the another node using the same time-frequency resource.

FIG. 5B is a flow diagram of a method 520 for determining a spatial compatibility metric for at least two nodes and transmitting to the at least two nodes using a same time-frequency resource, arranged in accordance with examples described herein.

The method 520 includes calculating a spatial signature metric for a first node, based at least on receive signal strength data for the first node and signal-to-interference data for the first node in block 522; calculating a spatial signature metric for a second node, based at least on receive signal strength data for the second node and signal-to-interference data for the second node in block 524; calculating a compatibility metric for the first node and the second node, based at least on the spatial signature metric for the first node and the spatial signature metric for the second node in block 526; determining, based on the compatibility metric, the first node and the second node are spatially compatible based at least on the compatibility metric exceeding a threshold in block 528; selecting, based on the calculated compatibility metric, the first node and the second node of the plurality of nodes in block 530; scheduling the first node and the second node to use a same time-frequency resource based on the compatibility metric in block 532; and, transmitting, to the first node and the second node, one or more signals using the same time-frequency resource in block 534.

Block 522 recites calculating a spatial signature metric for a first node, based at least on receive signal strength data for the first node and signal-to-interference data for the first node.

Block 524 recites calculating a spatial signature metric for a second node, based at least on receive signal strength data for the second node and signal-to-interference data for the second node.

Block 526 recites calculating a compatibility metric for the first node and the second node, based at least on the spatial signature metric for the first node and the spatial signature metric for the second node.

Block 528 recites determining, based on the compatibility metric, the first node and the second node are spatially compatible based at least on the compatibility metric exceeding a threshold.

Block 530 recites selecting, based on the calculated compatibility metric, the first node and the second node of the plurality of nodes. In some examples, one or more components of base node 102 may select the first node and the second node based on the calculated compatibility metric. In some examples, one or more processors of base node 102, such as processor 110 may select the first node and the second node based on the calculated compatibility metric. In some examples, sounding signal transmitter 106 may select the first node and the second node based on the calculated compatibility metric. In some examples, other components, shown and/or not shown, of base node 102 may select the first node and the second node based on the calculated compatibility metric.

Block 532 recites scheduling the first node and the second node to use a same time-frequency resource based on the compatibility metric. In some examples, one or more components of base node 102 may schedule the first node and the second node to use a same time-frequency resource based on the compatibility metric. In some examples, one or more processors of base node 102, such as processor 110 may schedule the first node and the second node to use a same time-frequency resource based on the compatibility metric. In some examples, sounding signal transmitter 106 may schedule the first node and the second node to use a same time-frequency resource based on the compatibility metric. In some examples, other components, shown and/or not shown, of base node 102 may schedule the first node and the second node to use a same time-frequency resource based on the compatibility metric.

Block 534 recites transmitting, to the first node and the second node, one or more signals using the same time-frequency resource. In some examples, one or more components of base node 102 may transmit, to the first node and the second node, one or more signals using the same time-frequency resource. In some examples, sounding signal transmitter 106 may transmit, to the first node and the second node, one or more signals using the same time-frequency resource. In some examples, other components, shown and/or not shown, of base node 102 may transmit, to the first node and the second node, one or more signals using the same time-frequency resource.

In some examples, and as described herein, a base node, such as base node 200 of FIG. 2 and/or base node 102 of FIG. 1 may be configured to transmit one or more sounding signals (e.g., a sequence of beamformed sounding signals) and/or a sounding sequence to a remote node, such as remote node 104 of FIG. 1 and/or remote node 300 of FIG. 3. In response, base node 200 of FIG. 2 and/or base node 102 of FIG. 1 may be configured to receive SINR data and/or RXSI data from remote node 104 of FIG. 1 and/or remote node 300 of FIG. 3.

In some examples, each node in the communication system that received one or more sounding signals (e.g., the sequence of beamformed sounding signals) may respond by transmitting respective SINR data and/or RXSI data to the base node. In some examples, the base node, such as base node 102 and/or base node 200 may utilize the SINR data and/or the RXSI data to determine whether a remote node and another node, e.g., at least two nodes, are spatially compatible.

In some examples, base node 102 may calculate a first spatial signature metric for the first node, based on the receive signal strength data for the first node and the signal-to-interference data for the first node. The base node 102 may further calculate a second spatial signature metric for the second node based on the receive signal strength data for the second node and the signal-to-interference data for the second node. Using the first spatial signature metric and the second spatial signature metric, base node 102 may be configured to calculating the compatibility metric for the at least two nodes. In some examples, spatial compatibility metric may be calculated based at least on combining SINR and/or RXSI, as described herein. In some examples, spatial compatibility metric may be calculated based at least on multiplying SINR and/or RXSI, as described herein. In some examples, spatial compatibility metric may be calculated based at least on a correlation between data received from the first node of the at least two nodes, and data received from the second node of the at least two nodes.

In some examples, if a base node 102 and/or base node 200 determine that remote node 300 and another node, such as another node in system 100 (not shown) are spatially compatible, base node 102 and/or base node 200 may schedule remote node 300 and the another node together at the same time, select a same time-frequency resource for remote node 300 and the another node, and transmit one or more data signals to the remote node 300 and the another node using the same time-frequency resource.

In this way, examples described herein facilitate and/or enable determining which nodes (e.g., remote nodes) within a wireless communications system are spatially compatible with each other in order to schedule data signals to the nodes using the same time-frequency resource. Examples described herein facilitate and/or enable the determination of initial transmit weights used by a base node when sending signals (e.g., sounding signals, data signals, a sequence of beamformed sounding signals) to one or more remote nodes of the communications system.

Figure 5C:
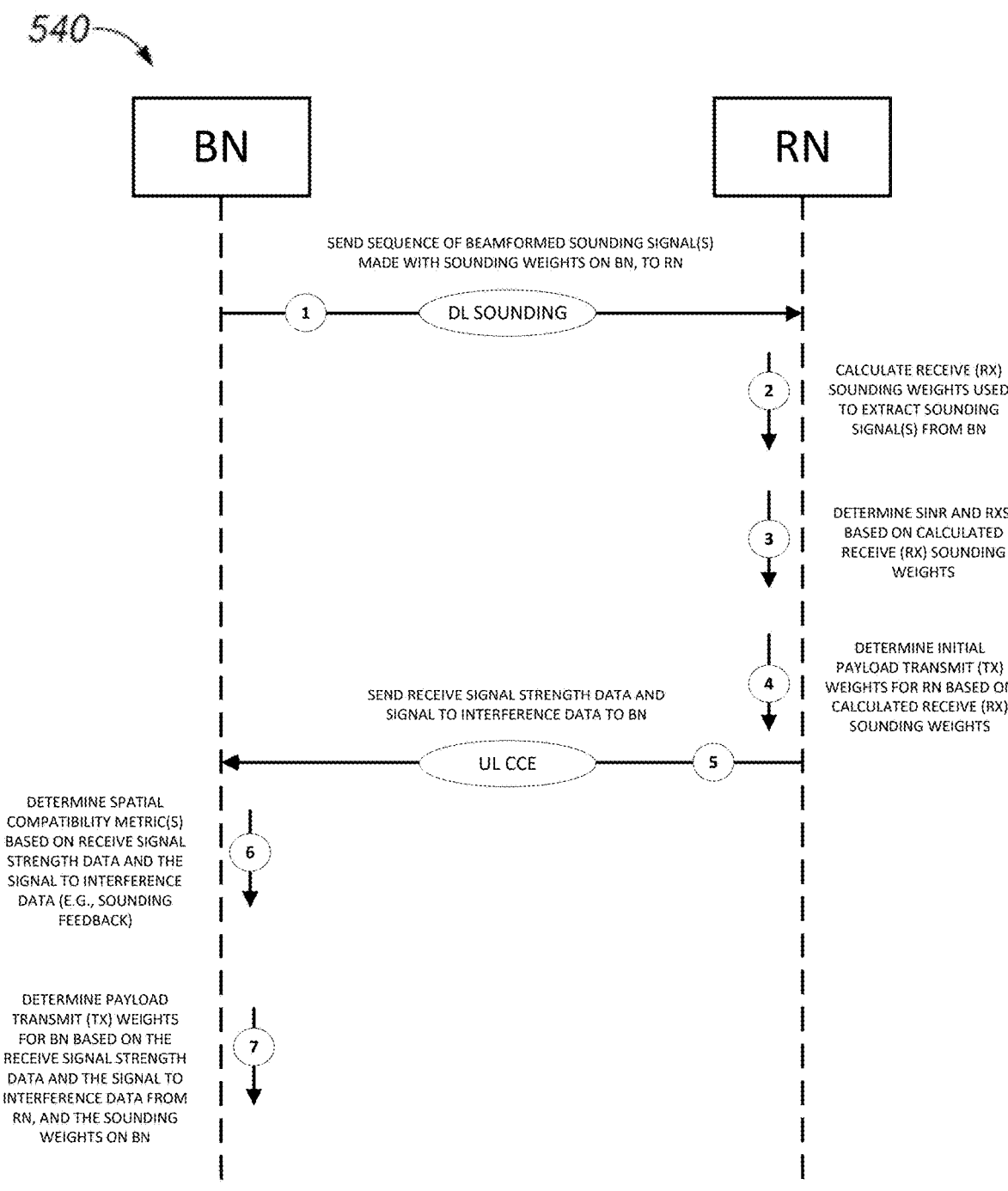
FIG. 5C depicts a sample sequence diagram 540, arranged in accordance with examples described herein.

FIG. 5C depicts a sample sequence diagram 540, arranged in accordance with examples described herein.

Sequence diagram 540 includes a base node (BN) and a remote node (RN). The base node of sequence diagram 540 may be configured to perform one or more of the functions described herein, including one or more functions of base node 102 of FIGS. 1 and/or 2. Further, base node 102 of FIGS. 1 and/or 2 may be configured to perform one or more of the operations performed by the base node of sequence diagram 540.

The remote node of sequence diagram 540 may be configured to perform one or more of the functions described herein, including one or more functions of remote node 104 of FIGS. 1 and/or 2. Further, base node 104 of FIGS. 1 and/or 2 may be configured to perform one or more of the operations performed by the remote node of sequence diagram 540.

Sequence diagram 540 includes six steps. At step 1, the base node sends (e.g. transmits) a sequence of beamformed sounding signal(s) (e.g., broadcast signal(s), a sequence of broadcast signal(s), etc.) to the remote node. In some examples, the base node sends (e.g., transmits) the sequence of beamformed sounding signals via a downlink (DL) sounding channel. In some examples, the base node transmits the sequence of beamformed sounding signals based on sounding transmit weights, such as sounding transmit weights 118 of FIG. 1. In some examples, and while not shown in sequence diagram 540, the base node may transmit one or more sequences of beamformed sounding signals to a plurality of nodes, in some examples, including the remote node of sequence diagram 540. In some examples, one or more components of the base node, such as one or more components of base node 102 of FIGS. 1 and 2 may be configured to transmit the sequence of beamformed sounding signals to the remote node. For example, sounding signal transmitter 106 of FIG. 1 may be configured to transmit the sequence of beamformed sounding signals to the remote node (and/or other remote nodes, and/or a plurality of nodes, etc.).

At step 2, the remote node receives the beamformed sequence of sounding signals from the base node and calculates receive sounding weights. In some examples, the remote node may receive the beamformed sequence of sounding signals via one or more of the transceivers of remote node 300 of FIG. 3 and/or one or more transceivers of remote node 104 of FIG. 1 (not shown). In some examples, the remote node calculates the receive sounding weights (such as receive sounding weights 138 of FIG. 1 and/or receive sounding weights 138 of FIG. 3 by determining which receive soundings weights are needed to extract the sequence of beamformed sounding signals received from the base node. In some examples, one or more components of a remote node may be configured to calculate the receive sounding weights (such as receive sounding weights 138 of FIG. 1 and/or receive sounding weights 138 of FIG. 3 and/or extract the sequence of beamformed sounding signals, such as sounding processor 130 of FIGS. 1 and/or 3. In some examples, one or more components (e.g., one or more processors) of a remote node may be configured to calculate the receive sounding weights and/or extract the sequence of beamformed sounding signals by executing one or more executable instructions (not shown) stored on memory (not shown) on a remote node. In some examples, the remote node may be configured to receive sequences of beamformed sounding signals from one or more other base nodes (not shown) and may be configured to determine which base node it prefers to communicate with based on one or more systems and methods described herein.

At step 3, the remote node determines signal to interference data (such as signal to interference data 134 of FIG. 1 and/or signal to interference data 134 of FIG. 2) and/or receive signal strength data such as receive signal strength data 136 of FIG. 1 and/or receive signal strength data 136 of FIG. 3) based at least on the calculated receive sounding weights. In some examples, the receive signal strength data may include signal-to-interference-noise ratio (SINR) data and/or information. In some examples, the receive signal strength data may include RXSI data and/or information. In some examples, one or more components of a remote node may be configured to determine the signal to interference data and/or the receive signal strength data, such as sounding processor 130 of FIGS. 1 and/or 3. In some examples, sounding feedback that a remote node may transmit to a base node may include signal to interference data and/or receive signal strength data. In some examples, one or more components (e.g., one or more processors) of a remote node may be configured to determine the signal to interference data and/or the receive signal strength data by executing one or more executable instructions (not shown) stored on memory (not shown) on a remote node.

At step 4, the remote node determines initial payload transmit weight(s) (such as initial payload transmit weight(s) 146 of FIG. 1 and/or initial payload transmit weight(s) 146 of FIG. 3) based at least on the calculated receive sounding weights. In some examples, one or more components of a remote node may be configured to determine the initial payload transmit weight(s) such as initial payload transmit weight(s) 146 of FIG. 1 and/or initial payload transmit weight(s) 146 of FIG. 3, such as sounding processor 130 of FIGS. 1 and/or 3 and/or other components of the remote node. In some examples, one or more components (e.g., one or more processors) of a remote node may be configured to determine the initial payload transmit weight(s) by executing one or more executable instructions (not shown) stored on memory (not shown) on a remote node.

At step 5, the remote node sends (e.g., transmits) sounding feedback, such as the calculated signal to interference data (such as signal to interference data 134 of FIG. 1) and/or receive signal strength data (such as receive signal strength data 136 of FIG. 1) to the base node. In some examples, the remote node sends (e.g., transmits) the calculated signal to interference data and/or receive signal strength data to the base node via an uplink (UL) control channel element (CCE) channel. In some examples, the remote nodes sends additional and/or alternative data to the base node. In some examples, the remote node sends sounding feedback. In some examples, the sounding feedback may include and/or comprise signal strength data and/or signal-to-interference data for the remote node. In some examples, the sounding feedback may include and/or comprise signal strength data and/or signal-to-interference data for one or more other remote nodes, such as one or more other remote nodes of the systems described herein. In some examples, the remote node sends channel estimations and/or feedback data and/or information. In some examples, one or more components (e.g., one or more processors) of a remote node may be configured to transmits the calculated signal to interference data and/or receive signal strength data to the base node by executing one or more executable instructions (not shown) stored on memory (not shown) on a remote node.

As noted above, in some examples, the remote node may receive a beamformed sequence of sounding signals from more than one base node (not shown). In some examples, the remote node may be configured to determine the corresponding receive sounding weights for each beamformed sequence of sounding signals, corresponding signal to interference data and/or receive signal strength data, and/or corresponding initial payload transmit weights. In some examples, the remote node may use this information to determine (e.g., choose, select, etc.) which base node to communicate with and/or transmit respective signal to interference data and/or receive signal strength data. In some examples, once the remote node has selected a base node to send respective signal to interference data and/or receive signal strength data, it may additionally and/or alternatively transmit data and/or information to that base node regarding the other base nodes communicating with that remote node. In some examples, one or more components of a remote node may be configured to transmit the signal to interference data and/or the receive signal strength data to the base node, such as one or more of the transceivers of FIG. 3.

At step 6, the base node receives sounding feedback, such as the signal to interference data and/or the receive signal strength data from the remote node, and may be configured to determine a spatial compatibility metric for two or more nodes, such as the remote node in FIG. 5C and another node, not shown. As should be appreciated, at step 6, the base node may be configured to determine and/or compute and/or calculate a spatial compatibility metric using the methods described herein, such as based at least on the receive signal strength data and/or the signal to interference data (e.g., sounding feedback) received from the remote node. In some examples, one or more components (e.g., one or more processors) of a base node may be configured to determine a spatial compatibility metric for two or more nodes by executing one or more executable instructions stored on memory on a base node such as one or more of the executable instructions shown on memory of the base node in FIG. 1 and/or FIG. 2.

At step 7, the base node may be configured to, based on the signal to interference data received from the remote node and/or the receive signal strength data received from the remote node and/or the sounding transmit weights, determine payload transmit wight(s), such as payload transmit weights 144 of FIG. 1 and/or payload transmit weights 144 of FIG. 2. In some examples, one or more components of the base node, such as one or more components of base node 102 of FIGS. 1 and 2 may be configured to determine payload transmit weight(s), such as payload transmit weights 144 of FIG. 1 and/or payload transmit weights of FIG. 2. In some examples, one or more processors, such as processor 110, and/or one or more sounding signal transmitters, such as sounding signal transmitter 106, of base node 102 of FIGS. 1 and 2 may be configured to determine payload transmit wight(s), such as payload transmit weights 144 of FIG. 1 and/or payload transmit weights 144 of FIG. 2. In some examples, one or more components (e.g., one or more processors) of a base node may be configured to, based on the signal to interference data received from the remote node and/or the receive signal strength data received from the remote node and/or the sounding transmit weights, determine payload transmit wight(s) by executing one or more executable instructions stored on memory on a base node such as one or more of the executable instructions shown on memory of the base node in FIG. 1 and/or FIG. 2.

In some examples, the base node may transmit one or more signals (e.g., data signals, payload signals, sequence of data signals, etc.) to the remote node based on the determined payload transmit wight(s). In some examples, the base node may further determine a spatial compatibility metric based on the signal to interference data and/or the receive signal strength data from the remote node.

The sequence diagram 540 of FIG. 5C is exemplary, and it should be appreciated that one or more additional and/or alternative implementations described herein may be utilized to perform the operations described herein, without departing from the scope of this disclosure.

Various features described herein may be implemented in hardware, software executed by a processor, firmware, or any combination thereof. If implemented in software (e.g., in the case of the methods described herein), the functions may be stored on or transmitted over, as one or more instructions or code, a computer-readable medium. Computer-readable media includes both non-transitory computer storage media and communication media including any medium that facilitates transfer of a computer program from one place to another. A non-transitory storage medium may be any available medium that can be accessed by a general-purpose or special-purpose computer. By way of example, and not limitation, non-transitory computer-readable media can comprise RAM, ROM, electrically erasable programmable read-only memory (EEPROM), or optical disk storage, magnetic disk storage, or other magnetic storage devices, or any other non-transitory medium that can be used to carry or store desired program code means in the form of instructions or data structures and that can be accessed by a general-purpose or special-purpose computer, or a general-purpose or special-purpose processor.

From the foregoing, it will be appreciated that, although specific embodiments of the disclosure have been described herein for purposes of illustration, various modifications may be made without deviating from the spirit and scope of the disclosure. Thus, the disclosure is not limited to the examples and designs described herein except as by the appended claims, and is to be accorded the broadest scope consistent with the principles and novel features disclosed herein.

What is claimed is:

1. A method comprising:
transmitting, from a base node, a sequence of beamformed sounding signals to a plurality of nodes including a first node and a second node;
receiving, responsive to the sequence of beamformed sounding signals and at the base node, a corresponding sequence of receive signal strength data and signal-to-interference data for each node of the plurality of nodes;
calculating, at the base node, a compatibility metric for at least two nodes of the plurality of nodes, including the first node and the second node, based at least on the sequence of receive signal strength data and the signal-to-interference data.

2. The method of claim 1, wherein the sequence of receive signal strength data comprises RXSI information and is indicative of a strength of a received signal received at one or more of the plurality of nodes, and wherein the signal-to-interference data comprises signal-to-interference-noise ratio (SINR) information.

3. The method of claim 1, the method further comprising calculating, at the base node, a compatibility metric for at least three nodes of the plurality of nodes, including the first node and the second node, based at least on the sequence of receive signal strength data and the signal-to-interference data.

4. The method of 1, the method further comprising
receiving, responsive to the sequence of beamformed sounding signals and at the base node, spatial signature information, channel metric information, or a combination thereof from the first node and the second node, and
receiving, responsive to the sequence of beamformed sounding signals and at the base node, sounding feedback from the first node and the second node, wherein the sounding feedback includes information regarding one or more other base nodes.

5. The method of claim 1, further comprising:
calculating, at the base node, a first spatial signature metric for the first node, based at least on receive signal strength data for the first node and the signal-to-interference data for the first node;
calculating, at the base node, a second spatial signature metric for the second node, based at least on receive signal strength data for the second node and the signal-to-interference data for the second node; and
calculating the compatibility metric for the at least two nodes, comprising the first node and the second node, based at least on the first spatial signature metric for the first node and the second spatial signature metric for the second node.

6. The method of claim 1, further comprising:
determining, at the base node and based on the compatibility metric for the at least two nodes, the first node and the second node are spatially compatible based at least on the compatibility metric for the at least two nodes exceeding a threshold;

selecting, based on the calculated compatibility metric, the at least two nodes comprising the first node and the second node;

scheduling the first node and the second node to use a same time-frequency resource based on the compatibility metric; and transmitting, from the base node and to the first node and the second node, one or more signals using the same time-frequency resource.

7. The method of claim 1, wherein calculating the compatibility metric for the at least two nodes, including the first node and the second node, further comprises combining receive signal strength data for the first node and the signal-to-interference data for the first node, and combining receive signal strength data for the second node and the signal-to-interference data for the second node.

8. The method of claim 7, wherein said combining the receive signal strength data for the first node and the signal-to-interference data for the first node comprises multiplying, and wherein said combining the receive signal strength data for the second node and the signal-to-interference data for the second node comprises multiplying.

9. The method of claim 1 wherein calculating the compatibility metric for the at least two nodes further comprises calculating a correlation between data received from the first node, including the receive signal strength data for the first node and the signal-to-interference data for the first node, and data received from the second node, including the receive signal strength data for the second node and the signal-to-interference data for the second node.

10. The method of claim 1 wherein the receive signal strength data and the signal-to-interference data is computed over several portions of a communication bandwidth such as a sub-band, a sub-band pair, or a combination thereof.

11. The method of claim 10 wherein the receive signal strength data and the signal-to-interference data is combined across the communication bandwidth to suppress noise and interference before calculating the compatibility metric.

12. The method of claim 11, wherein said combining is performed by sorting and selecting a percentile.

13. The method of claim 1, the method further comprising:

computing, at the base node and based on sounding transmit weights and the corresponding sequence of receive signal strength data and the signal-to-interference data, payload transmit weights for the one or more of the plurality of nodes.

14. The method of claim 13, the method further comprising selecting, at the base node, the payload transmit weights, wherein the payload transmit weights comprise a spatial signature derived from at least the receive signal strength data and the signal-to-interference data.

15. The method of claim 14, wherein the payload transmit weights are computed, at the base node, from a matrix of weighted outer products of the sounding transmit weights.

16. The method of claim 15, wherein the payload transmit weights are selected, at the base node, as dominant eigenvectors of the matrix of weighted outer products of the sounding transmit weights.

17. The method of claim 1, the method further comprising predicting, at the base node, signal quality for the plurality of nodes based at least on the receive signal strength data and the signal-to-interference data.

18. The method of claim 6, the method further comprising predicting, at the base node and using the compatibility metric, signal quality for the at least two nodes, including the first node and the second node, when the first node and the second node are scheduled on the same time-frequency resource.

19. The method of claim 6, the method further comprising computing, at the base node and using the compatibility metric, a loss when scheduling multiple nodes of the plurality of nodes on the same time-frequency resource.

20. The method of claim 1, wherein each beamformed sounding signal of the sequence of beamformed sounding signals is beamformed by the base node, and wherein the method further comprises:

estimating, by the base node, a channel estimate from each transmit antenna at the base node to each receive antenna at the plurality of nodes using a sequence of received signals, including the receive signal strength data and the signal-to-interference data.

21. The method of claim 20, wherein said estimating comprises an estimation scheme, and wherein the estimation scheme is further based on interference mitigation.

22. The method of claim 21, wherein the interference mitigation is based on whitening one or more received signals of the sequence of received signals.

23. The method of claim 1, wherein the base node uses a first sequence of sounding transmit weights, and wherein one or more other base nodes each uses a respective sequence of sounding transmit weights different from the first sequence of sounding transmit weights.

24. The method of claim 1, the method further comprising detecting, via the base node, one or more nodes, including the first node and the second node, that receive signals from one or more base nodes, including the base node, wherein the one or more nodes comprise one or more sector edge nodes, one or more cell edge nodes, or a combination thereof, the detecting based at least on the signal strength data and the signal-to-interference data.

25. The method of claim 1, the method further comprising detecting, via the base node, grating lobes based at least on the signal strength data and the signal-to-interference data.

26. The method of claim 6, wherein an initial allocation of the time-frequency resource, including the said scheduling of the time-frequency resource for the at least two nodes, is based at least partially on sounding signal strength data and the signal-to-interference data.

27. The method of claim 25, wherein an initial control channel element (CCE) channel allocation is based on the sounding transmit weights, the signal strength data, and the signal-to-interference data.

28. The method of claim 26, wherein a maximum beam index is signaled in a UL PUCRCH channel.

29. The method of claim 1, the method further comprising combining, by the base node, a sequence of beamformed sounding transmit weights, the sounding signal strength data, and the signal-to-interference data with an estimated propagation time and an angle, to estimate a geographical location of one or more nodes of the plurality of nodes.

30. The method of claim 29, the method further comprising detecting, based at least on the estimated geographical location, incorrect user entry, global positioning system (GPS) malfunction, or combinations thereof.

31. The method of claim 1, the method further comprising estimating, at the base node, an amount of signal scattering based at least on the sounding signal strength data and the signal-to-interference data.

32. The method of claim 31, wherein links, including an uplink channel, a downlink channel, or combinations thereof, are classified as line-of-sight (LOS), near-LOS (nLOS), non-LOS (NLOS), or combinations thereof.

33. The method of claim 1, wherein multiple sequences of beamformed sounding signals, including the sequence of beamformed sounding signals, are transmitted on a same time-frequency resource.

34. The method of claim 33, the method further comprising combining, at the base node, the sounding signal strength data and the signal-to-interference data from the multiple sequences of beamformed sounding signals transmissions.

35. The method of claim 34, the method further comprising computing, at the base node, the payload transmit weights from a set of matrices of weighted outer products of receive sounding weights per sounding signal.

36. The method of claim 35, the method further comprising computing, at the base node, the payload transmit weights as eigenvectors of a weighted combination of the matrices.

37. The method of claim 35, wherein signal quality is predicted, at the base node, by weighting the sounding signal strength data and the signal-to-interference data based on eigenvalues of a weighted combination of matrices or a correlation of eigenvectors of individual matrices, or a combination thereof.

38. The method of claim 37, the method further comprising scheduling, at the base node, a number of payload streams on the same time-frequency resource, the scheduling based partially on the eigenvalues of a weighted combination of the weighted outer products of the receive sounding weights per sounding signal.

39. The method of claim 15, wherein the sounding transmit weights are computed based on antenna placement density.

40. The method of claim 39, the method further comprising minimizing, by the base node, an angular region to sweep with the sounding transmit weights by accounting for grating lobes.

41. The method of claim 39, the method further comprising calculating, at the base node, the payload transmit weights in a cosine domain such that a gain dip between beams is the same at an intersection between all beams.

42. The method of claim 41, wherein the beams sweep at horizontal (azimuth) angles, vertical angles, or a combination thereof.

43. A method comprising:
receiving, from a base node and at a remote node, a sequence of beamformed sounding signals;
determining, at the remote node and based on receive sounding weights, receive signal strength data and signal-to-interference data;
determining, at the remote node, initial payload transmit weights based on the receive sounding weights; and
transmitting, from the remote node and to the base node, the receive signal strength data and the signal-to-interference data, wherein the receive signal strength data and the signal-to-interference data transmitted from the remote node to the base node is usable, by the base node, to determine a spatial compatibility metric for the remote node and another remote node.

44. The method of claim 43, wherein the receive signal strength data is indicative of a strength of a received signal, received at the remote node and from the base node, measured at the remote node.

45. The method of claim 43, wherein the signal-to-interference data comprises signal-to-interference-noise ratio (SINR) data.

46. The method of claim 43, the method further comprising transmitting, from the remote node and to the base node, the receive signal strength data and the signal-to-interference data using an uplink (UL) control channel element (CCE) channel.

47. The method of claim 43, the method further comprising extracting, at the remote node the sequence of beamformed sounding signals, the extracting based on determining the receive sounding weights to perform the extracting.

48. The method of claim 47, the method further comprising determining payload transmit weights based at least on the receive sounding weights.

49. The method of claim 48, wherein determining the payload transmit weights is based at least on a receive sounding weight corresponding to a maximum achieved signal-to-interference ratio.

50. The method of claim 47, wherein determining the payload transmit weights is based at least on a matrix of weighted outer products of the receive sounding weights.

51. The method of claim 48, wherein weighting is based at least on the receive signal strength data and the signal-to-interference data.

52. The method of claim 43, the method further comprising receiving, from the base node and at the remote node, the sequence of beamformed sounding signals via a downlink (DL) sounding channel.

53. The method of claim 43, the method further comprising:
receiving, from another base node and at the remote node, another sequence of beamformed sounding signals;
extracting, at the remote node the another sequence of beamformed sounding signals, the extracting based on determining another receive sounding weights to perform the extracting of the another sequence of beamformed sounding signals;
determining, at the remote node and based on the another receive sounding weights, receive signal strength data and signal-to-interference data for the another base node;
determining, at the remote node, initial payload transmit weights for the another base node based on the receive signal strength data and the signal-to-interference data for the another base node; and
transmitting, from the remote node and to the base node, the receive signal strength data and the signal-to-interference data for the another base node.

* * * * *